United States Patent
Uchiumi et al.

(10) Patent No.: US 7,587,567 B2
(45) Date of Patent: *Sep. 8, 2009

(54) STORAGE CONTROL SYSTEM

(75) Inventors: Katsuhiro Uchiumi, Fujisawa (JP); Hiroshi Kuwabara, Ninomiya (JP); Keishi Tamura, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/798,658

(22) Filed: May 16, 2007

(65) Prior Publication Data

US 2007/0226441 A1   Sep. 27, 2007

Related U.S. Application Data

(63) Continuation of application No. 11/490,101, filed on Jul. 21, 2006, now Pat. No. 7,237,083, which is a continuation of application No. 10/834,873, filed on Apr. 30, 2004, now Pat. No. 7,117,331.

(30) Foreign Application Priority Data

Mar. 5, 2004   (JP)   ............................. 2004-061641

(51) Int. Cl.
    *G06F 12/00*   (2006.01)
(52) U.S. Cl. ..................................................... 711/164
(58) Field of Classification Search ........................ None
    See application file for complete search history.

(56) References Cited

U.S. PATENT DOCUMENTS

| | | |
|---|---|---|
| 5,325,424 A | 6/1994 | Grube ..................... 379/93.03 |
| 5,680,640 A | 10/1997 | Ofek et al. |
| 5,896,548 A | 4/1999 | Ofek |
| 6,553,471 B1 | 4/2003 | O'Hare et al. |
| 6,606,695 B2 | 8/2003 | Kamano et al. |
| 6,779,083 B2 | 8/2004 | Ito et al. |
| 6,823,398 B1 | 11/2004 | Lee et al. |
| 7,117,331 B2 | 10/2006 | Uchiumi et al. |
| 7,237,083 B2* | 6/2007 | Uchiumi et al. ............. 711/164 |
| 2002/0169901 A1 | 11/2002 | Fujibayashi et al. |
| 2003/0131207 A1 | 7/2003 | Arakawa et al. |
| 2004/0029526 A1 | 2/2004 | Miki et al. ................. 455/11.1 |

FOREIGN PATENT DOCUMENTS

| | | |
|---|---|---|
| EP | 1178407 | 2/2002 |
| EP | 1357476 | 10/2003 |
| JP | 10508967 | 9/1998 |
| JP | 2001337850 | 12/2001 |

* cited by examiner

*Primary Examiner*—Hiep T Nguyen
(74) *Attorney, Agent, or Firm*—Brundidge & Stanger, P.C.

(57) ABSTRACT

A plurality of key information items with a fixed constitution are stored in a shared memory of a first storage control system. Each key information item corresponds with each of the types of a second storage control system and includes, in a predetermined location in the key information, an information element that indicates the location of a particular information item among the plurality of information items in the control system information. A microprocessor in a Fiber Channel Adapter of the first storage control system determines whether to form a logical path with the second storage control system on the basis of the key information and the control system information that is received from the second storage control system.

10 Claims, 20 Drawing Sheets

FIG. 4

| VDEV # | EXTERNAL DEVICE INFORMATION | | | PATH INFORMATION | |
|---|---|---|---|---|---|
| | SYSTEM IDENTIFICATION INFORMATION (INCLUDING VENDOR ID, DEVICE NAME, AND MODEL NUMBER, FOR EXAMPLE) | CAPACITY (KB) | DEVICE TYPE | WWN | LUN |
| 0 | DRFGTFNEIEK | 657,456 | DISK | 0xAABBCCDD | 0 |
| 1 | ADRFGTFNEIE | 89,854 | DISK | 0xAABBEEFF | 3 |
| 2 | GGRRFFDDERT | | TAPE | 0x445566AAB | 5 |
| 3 | AABBCCDDEE | 5,544223 | DISK | 0x77DE12345 | 6 |
| | | | | 0x77DE12345 | 3 |
| | | | | 0x377DE7890 | 5 |

Tm

ALTERNATE PATHS (last three rows of VDEV# 3)

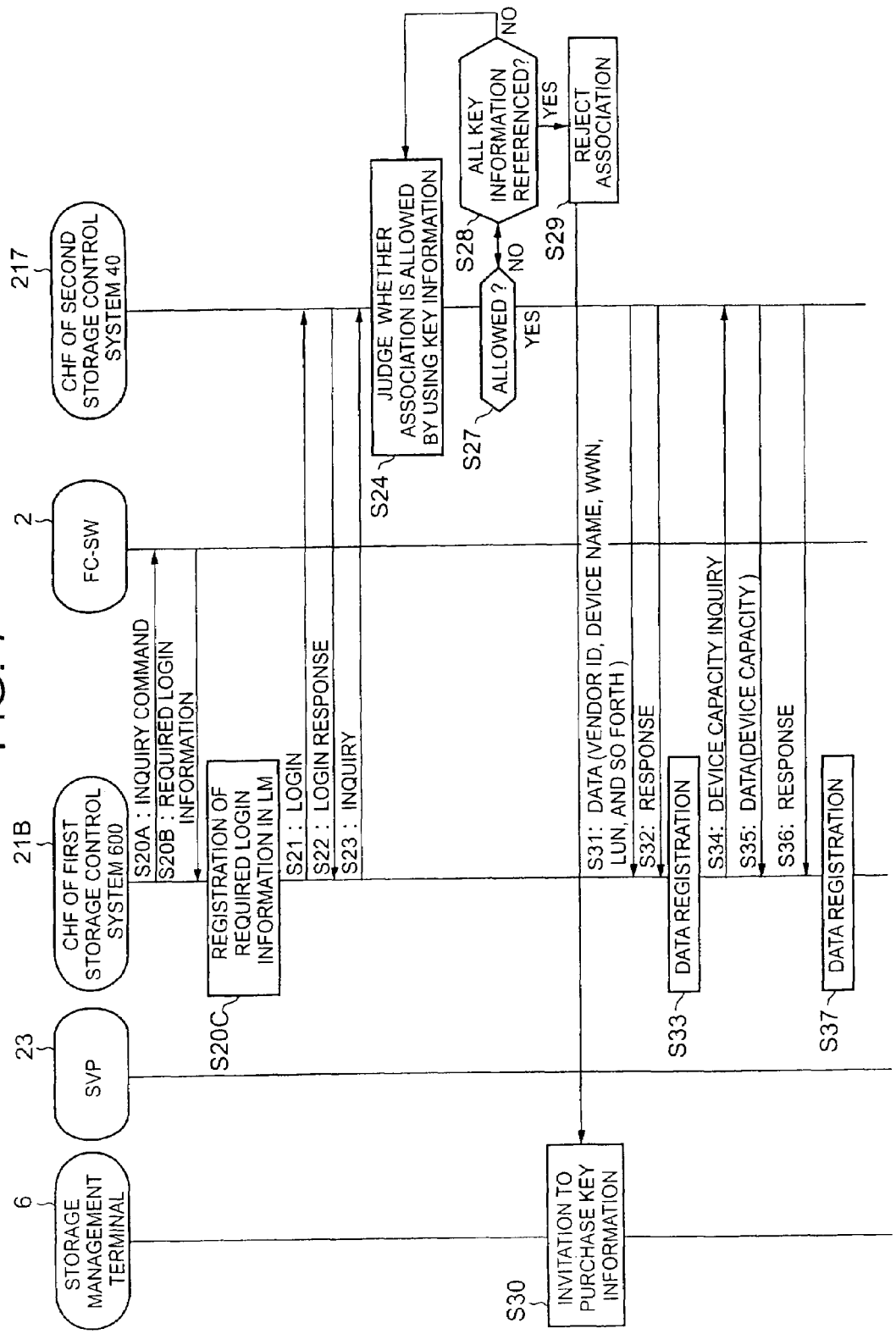

FIG. 9(a)
LUN - LDEV-VDEV CONVERSION TABLE
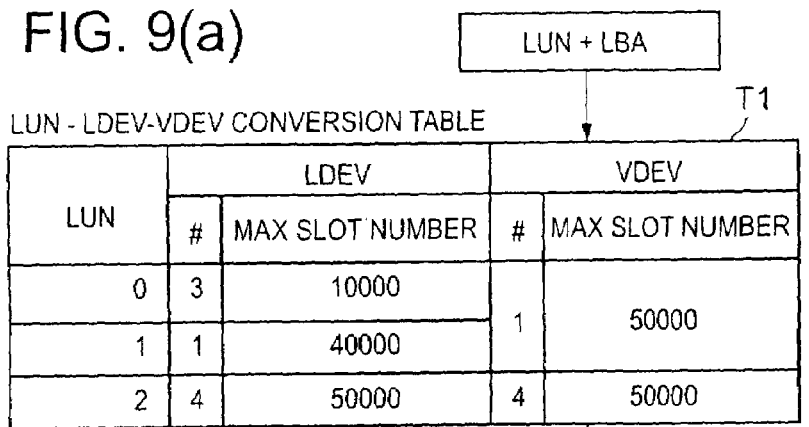
FIG. 9(b)
VDEV-EXTERNAL LUN CONVERSION TABLE
FIG. 9(c)
VDEV-EXTERNAL LUN CONVERSION TABLE (STRIPE, RAID SETTING)
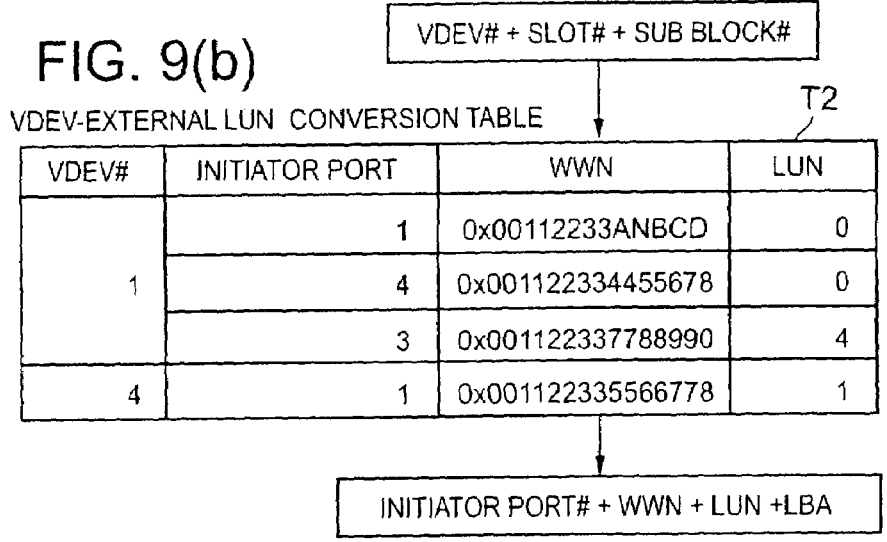

FIG. 14

| DEVICE | ITEM | | VENDOR ID | DEVICE NAME | PRODUCT NUMBER | WWN | LUN |
|---|---|---|---|---|---|---|---|
| 40A | ENTRY NAME | | COMPANY H | RAID400 | 62469 | 0x445566AAB | 1 |
| | BYTE POSITION | | 8 | 36 | 3 | 42 | 47 |
| | NUMBER OF BYTES | | 7 | 4 | 4 | 3 | 3 |
| | BILLING CAPACITY | | 2GB | | | | |

FIG. 19

Tmm

| VDEV # | EXTERNAL DEVICE INFORMATION ||||
| --- | --- | --- | --- | --- |
| | SYSTEM IDENTIFICATION INFORMATION (INCLUDING VENDOR ID, DEVICE NAME, AND MODEL NUMBER, FOR EXAMPLE) | CAPACITY (KB) | DEVICE TYPE | PATH INFORMATION ||
| | | | | iSCSI NAME | LUN |
| 0 | DRFGTFNEIEK | 657,456 | DISK | AAAAAA | 0 |
| 1 | ADRFGTFNEIE | 89,854 | DISK | DDDDDD | 3 |
| 2 | GGRRFFDDERT | | TAPE | CCCCCC | 5 |
| 3 | AABBCCDDEE | 5,544223 | DISK | DDDDDD | 6 |
| | | | | EEEEEE | 3 |
| | | | | FFFFFF | 5 |

ALTERNATE PATHS (last three rows of VDEV# 3)

STORAGE CONTROL SYSTEM

CROSS-REFERENCE TO RELATED APPLICATION

The present application is a continuation of application Ser. No. 11/490,101, filed Jul. 21, 2006, now U.S. Pat. No. 7,237,083; which is a continuation of application Ser. No. 10/834,873, filed Apr. 30, 2004, now U.S. Pat. No. 7,117,331; which claims priority from Japanese Patent Application Nos. 2004-61641, filed on Mar. 5, 2004, the entire disclosure of which is incorporated herein by reference.

FIELD OF THE INVENTION

The present invention relates to a storage control system.

BACKGROUND OF THE INVENTION

A database system that handles large-scale data such as a data center, for example, manages data by using a storage control system that is constituted separately from a host computer. This storage control system is a disk array system such as a RAID (Redundant Array of Independent Inexpensive Disks) that is constituted by arranging a multiplicity of storage devices in the form of an array, for example.

In step with the advances of an information-driven society, the amount of data to be managed by databases is increasing on a daily basis. For this reason, storage control systems with a higher performance and larger capacity are needed. New storage control systems are being developed to meet market demands. Two methods for introducing new storage control systems as storage systems may be considered. One such method involves completely switching an old storage control system for a new storage control system and constituting a storage system entirely from the new storage control system (Patent Document 1: Japanese Patent Application No. H10-508967). The other method involves combining usage of a new storage control system by newly adding the new storage control system to a storage system comprising the old storage control system.

Further, a technology that manages physical device storage areas in sector units and dynamically constitutes logical devices in sector units is also known (Patent Document 2: Japanese Patent Application Laid Open No. 2001-337850).

When a complete transition is made from an old storage control system to a new storage control system (Japanese Patent Application No. H10-508967), the functions and performance of the new storage control system can be utilized but the old storage control system cannot be effectively used, meaning that the introduction costs also increase. On the other hand, when the old storage control system and the new storage control system are combined, the number of storage control systems constituting the storage system increases and the labor involved in managing and running the new storage control system is large.

Further, when the responsiveness of a storage device that the old storage control system comprises is low, the performance of the whole system drops as a result of connecting the old storage device to the storage system. For example, when the old storage device is a device that involves a mechanical operation (head seek and so forth), there are cases where the mechanical operation time is long and where the data transfer buffer capacity that the old storage device comprises is small.

In addition, there are also cases where an old storage device cannot be utilized as in the case of open-system storage devices and mainframes, and servers that can only connect to storage devices with a specific function.

As one method for resolving this problem, a method that makes it possible to utilize storage resources effectively by allowing co-operation between first and second storage control systems, for example, may be considered.

However, with this method, for example, in a case where the first storage control system receives control system information relating to the second storage control system from the second storage control system, and the control processor (microprocessor, for example) of the first storage control system executes various processing based on the control system information thus received, when the type of the second storage control system (machine type or vendor, and so forth, for example) changes, the microprogram of the control processor of the first storage control system must be changed. This is because, when the machine type or vendor and so forth is different, the position, order, and data size of each information item (vendor ID, device name, and so forth, for example) of the control system information are sometimes different and there is the risk that the microprogram corresponding with a certain type of second storage control system will be unable to handle control system information that is outputted by an external storage control system of another second storage control system type.

Further, with the above method, when the host device is connected to the first storage control system, because the second storage control system cooperates with the first storage control system, there is a problem from the point of view of security when the host device is able to freely access the second storage control system via the first storage control system.

Furthermore, with the above method, in cases where a host device is connected to the first storage control system, when the host device consumes the storage capacity of the second storage control system via the first storage control system, there is the advantage that billing according to the storage capacity consumed is possible while preserving security.

SUMMARY OF THE INVENTION

Therefore, the present invention achieves at least any of the objects below:
(1) Providing a first storage control subsystem, whereby the microprogram of the control processor of the first storage control system need not be changed even when the type of the second storage control system is different.
(2) Providing a first storage control subsystem that does not allow the host device to freely access the second storage control system when the second storage control system and host device are connected to the first storage control system.
(3) Providing a first storage control system constituted such that, when the second storage control system and host device are connected to the first storage control system and the host device consumes the storage capacity of the second storage control system via the first storage control system, billing according to the storage capacity consumed is performed while preserving security.

Further objects of the present invention will become apparent from the following description.

The storage control system according to a first aspect of the present invention is connected to an external storage control system and a host device and controls access by the host device to the storage resources in the external storage control system. The storage control system comprises a plurality of logical storage devices that store data exchanged with the host device; one or a plurality of physical storage devices comprising the plurality of logical storage devices; a cache memory that stores data exchanged between the host device and the physical storage devices; a shared memory in which control information relating to the data is stored; a channel control unit, having a control processor, that receives control system information from the external storage control system and that controls data communications between the cache memory and at least one of the host device and the external storage control system; a disk control unit that controls data communications between the cache memory and the physical storage devices; and a key information storage area that stores one or a plurality of key information items with a fixed constitution. The control system information includes a plurality of information items. Each of the one or the plurality of key information items corresponds with each of the type or types of the external storage control system and includes, in a predetermined location in the key information item, an information element that indicates the location of a particular information item among the plurality of information items in the control system information. The control processor of the channel control unit selects a key information item from among the one or the plurality of key information items, judges whether, in the location in the received control system information indicated by the information element in the selected key information item, there exists an information item conforming with the particular information item indicated by the information element in the selected key information item, and forms a logical path between the host device and the storage resources in the external storage control system when an affirmative judgment result is obtained but does not form the logical path when a negative judgment result is obtained.

In a first embodiment according to the first aspect of the present invention, the key information item includes an information element that indicates at least one of the vendor ID and device name of an external storage control system corresponding with this key information item; an information element that indicates the location in the control system information of at least one of the vendor ID and the device name; and an information element that indicates the data size of at least one of the vendor ID and the device name.

In a second embodiment according to the first aspect of the present invention, a maintenance/management system for maintaining or managing the storage control system is connected to the channel control unit. When the affirmative judgment result is obtained, the control processor of the channel control unit transmits all the information items included in the received control system information to the maintenance/management system such that all the information items are displayed, and forms the logical path upon receiving a logical path formation request from the maintenance/management system.

In a third embodiment according to the first aspect of the present invention, another information element indicating the usable storage capacity in the storage resources in an external storage control system corresponding with the key information item is included in another predetermined location of the key information item. When write target data is received from the host device, the control processor of the channel control unit judges whether the storage capacity indicated by the another information element in the key information item corresponding with the external storage control system is exceeded by the total value of the data size of the write target data and the total data size of one or a plurality of data stored cumulatively in the external storage control system, and stores the write target data in the storage resources in the external storage control system when the indicated storage capacity is not exceeded.

In a fourth embodiment according to the first aspect of the present invention, when the total value exceeds the indicated storage capacity, the control processor of the channel control unit of the third embodiment communicates the fact that it is necessary to increase the storage capacity indicated by the another information element in the key information item to the host device, receives data for increasing the indicated storage capacity and then increases the value of the indicated storage capacity in the key information item.

In a fifth embodiment according to the first aspect of the present invention, the control processor of the channel control unit forms the logical path and then, when a predetermined event has occurred, receives the control system information from the external storage control system and performs the judgment, erasing the logical path if a negative judgment result is obtained.

In a sixth embodiment according to the first aspect of the present invention, a maintenance/management system for maintaining or managing the storage control system is connected to the channel control unit. The maintenance/management system comprises a maintenance/management storage unit for storing data. The key information item is downloaded to the maintenance/management system from a key management database that stores cumulatively a plurality of key information items corresponding with a plurality of types of external storage control system and is then stored in the key information storage area. The key information storage area is provided in at least one of the shared memory, local memory that is used by the control processor of the channel control unit, and the maintenance/management storage unit.

In a seventh embodiment according to the first aspect of the present invention, a Fibre Channel Adapter (an adapter connected to a Fibre Channel Switch, for example) or an iSCSI adapter is included in the channel control unit. The control processor is mounted in the Fibre Channel Adapter or the iSCSI adapter. Further, when the Fibre Channel Adapter is included, an external storage control system may be connected to the Fibre Channel Switch that is connected to the Fibre Channel Adapter.

In an eighth embodiment according to the first aspect of the present invention, the Fibre Channel Adapter or the iSCSI adapter of the seventh embodiment transmits an inquiry command (for example) according to the SCSI protocol to the external storage control system and receives the control system information from the external storage control system in response to the inquiry command.

A ninth embodiment according to the first aspect of the present invention comprises a virtual intermediate storage device between the logical storage device and the physical storage device. The control processor of the channel control unit forms the logical path by associating the logical storage device and an external logical storage device, which is a storage resource in the external storage control system, with a logical location in the virtual intermediate storage device.

A storage system according to a second aspect of the present invention comprises a first storage control system connected to a host device and a second storage control system connected to the first storage control system.

The second storage control system comprises a memory area for memorizing control system information relating to the second storage control system; a channel control unit, having a control processor, for controlling data communications with the first storage control system, and a key information storage area for storing one or a plurality of key information items with a fixed constitution. Each of the one or the plurality of key information items corresponds with each of the type or types of the second storage control system and includes, in a predetermined location in the key information item, an information element that indicates the location in the control system information of a particular information item among the plurality of information items in the control system information. The control processor of the channel control unit judges whether, in the location in the received control system information indicated by the information element in the key information item selected from the one or the plurality of key information items, there exists an information item conforming with the particular information item indicated by the information element in the selected key information item, and transmits all information items included in the control system information to the first storage control system when an affirmative judgment result is obtained but does not transmit the control system information or transmits only the other information item or items than the nonconforming information item included in the control system information to the first storage control system when a negative judgment result is obtained.

Upon receiving, from the second storage control system, all the information items included in the control system information, the first storage control system forms a logical path between the host device and the storage resources in the second storage control system on the basis of the received information items but does not form the logical path when all information items included in the control system information are not received or when only some information items are received.

Here, a disk array device and Fibre Channel Switch, and so forth, for example, can be cited as at least one of the first and second storage control systems. A computer such as a personal computer, mainframe or the like, for example, can be cited as the host device. The first storage control system and second storage control system are connected so as to be capable of two-way communications via a communication network and the first storage control system and host device are also connected so as to be capable of two-way communications via a communication network. Further, the second storage control system and host device can also be connected to allow two-way communications. A LAN (Local Area Network), SAN (Storage Area Network), dedicated line, and the Internet, and so forth, can be cited as examples of the communication network. Data-read processing and data-write processing, or the like, can be cited as examples of data processing in response to requests from the host device. The first and second storage control systems may be installed in the same site or installed in different sites. In addition, when the first storage control system comprises a storage device, the storage device may also be connected to a logical unit via an intermediate storage level.

The storage control system control method according to a third aspect of the present invention is applied to the following storage control system, that is, to a storage control system that is connected between an external storage control system and a host device and controls access by the host device to the storage resources in the external storage control system. This storage control system comprises key information item storage areas that store one or a plurality of key information items with a fixed constitution. Each of the one or the plurality of key information items corresponds to the type of the external storage control system and includes, in a predetermined location in the key information item, an information element that indicates the location in the control system information of a particular information item among the plurality of information items that the control system information relating to the external storage control system includes.

The control method comprises the steps of judging whether, in the location in the received control system information indicated by the information element in the key information item selected from the one or the plurality of key information items, there exists an information item conforming with the information item indicated by the information element in the selected key information item, forming a logical path between the host device and the storage resources in the external storage control system when an affirmative judgment result is obtained, and not forming the logical path when a negative judgment result is obtained.

The storage control system control method according to a fourth aspect of the present invention is applied to the following storage control system, that is, to a second storage control system of a storage system that comprises a first storage control system connected to a host device and the second storage control system, which is connected to the first storage control system. The second storage control system comprises a key information item storage area that stores one or a plurality of key information items with a fixed constitution. Each of the one or the plurality of key information items corresponds with the type of the external storage control system and includes, in a predetermined location in the key information item, an information element that indicates the location in the control system information of a particular information item among the plurality of information items that the control system information relating to the external storage control system includes.

The control method comprises the steps of judging whether, in the location in the received control system information indicated by the information element in the key information item selected from the one or the plurality of key information items, there exists an information item conforming with the information item indicated by the information element in the selected key information item, transmitting all information items included in the control system information to the first storage control system when an affirmative judgment result is obtained, and not transmitting the control system information or transmitting only information items with nonconforming information items removed to the first storage control system when a negative judgment result is obtained. In this case, the first storage control system executes, for example, the steps of forming a logical path between the host device and the storage resources in the second storage control system on the basis of the all the information items included in the control system information, and not forming the logical path when all the information items included in the control system information are not received or when only some information items are received.

BRIEF DESCRIPTION OF THE DRAWINGS

FIG. 4 is an explanatory view of an overview of a mapping table;

FIG. 7 shows an example of the flow of processing in a case where a first CHF 21B judges whether control system information may be associated with VDEV# by using one or a plurality of key information items stored in LM 221 or memory 223;

FIG. 9 is an explanatory view schematically showing an aspect in which a write data address is converted;

FIG. 14 shows a constitutional example of key information relating to a third modified example of this embodiment;

FIG. 19 shows a constitutional example of a mapping table Tmm in the sixth modified example.

DETAILED DESCRIPTION OF THE PREFERRED EMBODIMENT

Embodiments of the present invention will be described hereinbelow with reference to the drawings.

Figure 1:
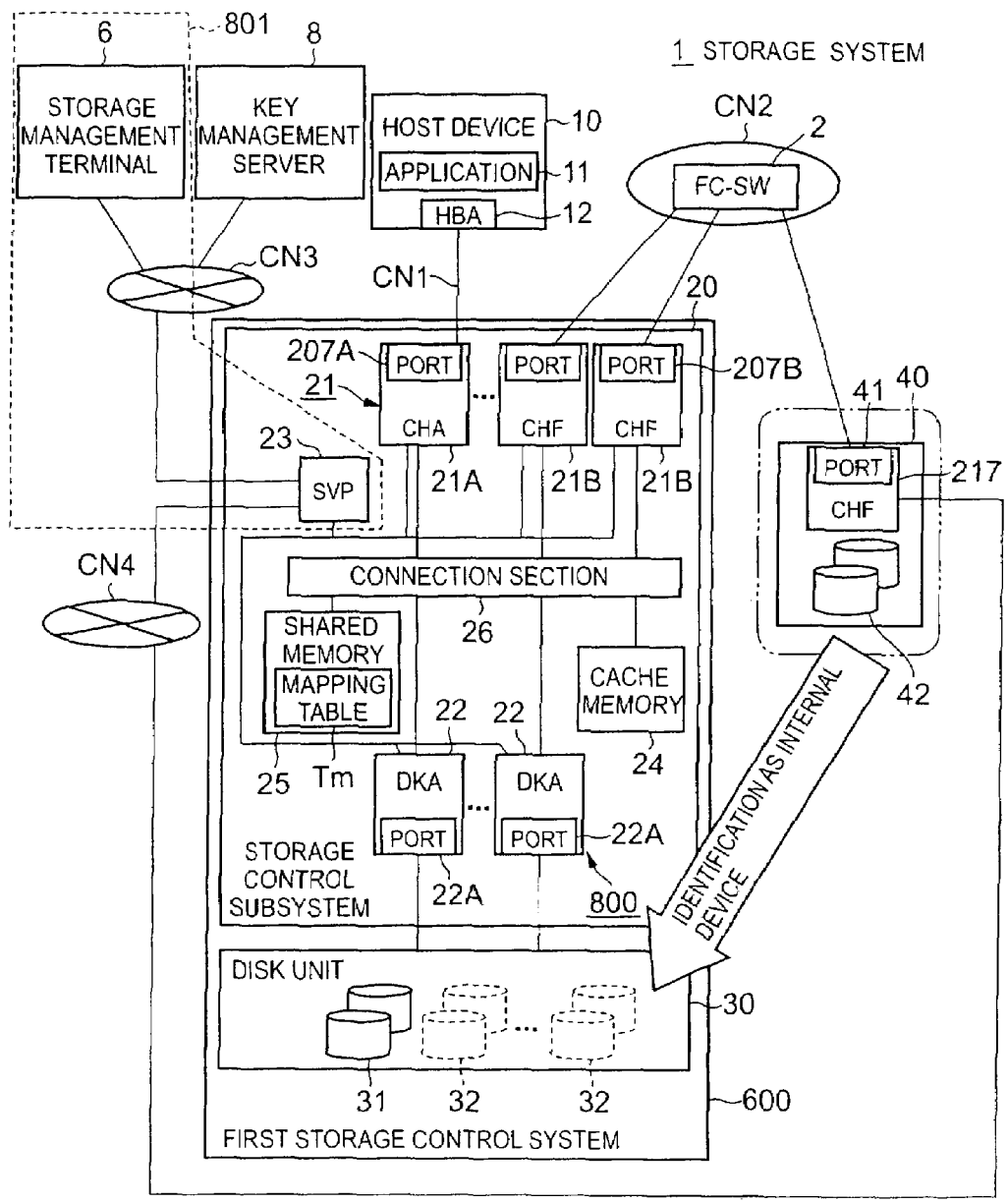
FIG. 1 is a block diagram that shows the constitution of the storage system according to an embodiment of the present invention.

FIG. 1 is a block diagram that shows the constitution of the storage system according to this embodiment.

A host device 10 is a computer device that comprises information processing resources such as a CPU (Central Processing Unit) and memory and so forth, for example, and is constituted as a personal computer, workstation, mainframe, or the like, for example. The host device 10 comprises information input devices (not shown) such as a keyboard switch, pointing device, microphone, and so forth, for example, and information output devices (not shown) such as a monitor display, speaker, and so forth, for example. In addition, the host device 10 is provided with an application program 11 such as database software that employs a storage area provided by the first storage control system 600, and an adapter 12 for accessing the first storage control system 600 via a communication network CN1, for example.

The host device 10 is connected to the first storage control system 600 via the communication network CN1. A LAN, SAN (Storage Area Network), the Internet, dedicated line, a public switched line, or the like, for example, can be suitably used as the communication network CN1 (and the communication networks CN3 and CN4 described subsequently) depending on the case. Data communications via a LAN are performed according to the TCP/IP (Transmission Control Protocol/Internet Protocol) protocol, for example. When the host device 10 is connected to the storage control system 600 via a LAN, the host device 10 requests data inputting/outputting in file units by designating a file name. On the other hand, when the host device 10 is connected to the first storage control system 600 via a SAN, the host device 10 requests data inputting/outputting with blocks constituting the data management units of storage areas supplied by a plurality of disk storage devices (hard disk drives, for example) serving as units, in accordance with the Fibre Channel Protocol. When the communication network CN1 is a LAN, the adapter 12 is a LAN-compatible network card, for example. When the communication network CN1 is a SAN, the adapter 12 is a host bus adapter, for example.

Further, in the drawings, the host device 10 is connected to only the first storage control system 600 via the communication network CN1. However, the host device 10 and the second storage control system 40 may be connected via a communication network CN2. The second communication network CN2 can be constituted by a SAN, LAN, the Internet, a dedicated line, a public-switched line, or the like, for example. However, in this embodiment, the second communication network CN2 is constituted by a Fibre Channel Switch (hereinafter abbreviated to 'FC-SW') 2.

The first storage control system 600 is a RAID system comprising a multiplicity of disk storage devices arranged in the form of an array, for example. However, the first storage control system 600 is not restricted to such a constitution and can also be constituted as a highly functional, intelligent Fibre Channel Switch. The first storage control system 600 provides the host device 10 with the storage resources of the second storage control system 40 as its own logical volume (Logical Unit), as described subsequently. Therefore local storage devices under the direct control of the host device 10 itself need not be included.

The first storage control system 600 can be broadly classified into a storage control subsystem 20 and a disk unit 30. The storage control subsystem 20 comprises a channel control unit 21, a disk control unit 800, an SVP (Service Processor) 23, a cache memory 24, a shared memory 25, and a connection section 26, for example. The channel control unit 21 comprises one or more channel adapters (CHA) 21A, and one or more Fibre Channel adapters (CHF) 21B, for example. The disk control unit 800 includes a plurality of disk adapters (DKA) 22.

The CHA 21A performs data communications with the host device 10. The CHA 21 comprises a communication port 207A for communicating with the host device 10. In addition, the CHA 21A is constituted as a microcomputer system comprising a CPU, memory, and so forth, for example, and parses and executes various commands received from the host device 10. A network address (IP address or WWN, for example) for identifying the CHA 21A is allocated to the CHA 21A. If the communication network CN1 is a LAN, for example, the CHA 21A is able to receive a file access request (a request that contains the file name, and a command to read or write the file with this file name, for example) from the host device 10 and act as NAS (Network Attached Storage) for processing the file access request. Alternatively, if the communication network CN1 is a SAN, for example, the CHA 21A is able to receive a block access request (block-unit data access request) from the host device 10 and process this block access request. Further, a 'block unit' is the management unit for data in the storage area of a disk storage device 400 that will be described subsequently.

The CHF 21B is connected to an FC-SW 2 via a communication port 207B. The CHF 21B is constituted as a microcomputer system that comprises a CPU, memory, and so forth, for example, and processes data received from the second storage control system 40 via the FC-SW 2. The constitution and functions of the CHF 21B will be described in detail subsequently.

Each DKA 22 passes data between logical storage devices (hereinafter LDEV) 31 and 32 in a disk unit 30. Each DKA 22 comprises a communication port 22A for a connection to the disk storage device 400 that comprises the LDEV 31 and 32. In addition, each DKA 22 is constituted as a microcomputer system that comprises a CPU, memory, and so forth. Each DKA 22 writes the data received from the CHA 21A or CHA 21C to the LDEV 31 and 32, and transmits the data read from the LDEV 31 and 32 to the CHA 21A or CHA 21C. When performing data inputting and outputting to and from the LDEV 31 and 32, each DKA 22 converts a logical address to a physical address.

The cache memory (sometimes abbreviated to 'CM' hereinafter) 24 is volatile or nonvolatile memory, for example, and temporarily stores data received from the host device 10 and data read from the LDEV 31 and 32, and so forth.

The shared memory (sometimes abbreviated to 'SM' hereinafter) 25 is a nonvolatile memory, for example, in which control information or the like relating to data exchanged with the host device is stored. Further, in addition to a work area (an area for temporarily storing messages exchanged between the CPUs of the CHA 21A, CHF 21B, and DKA 22, for example) being established in the shared memory 25, various tables such as a mapping table Tm (described subsequently) are stored therein. Further, any one of or a plurality of the LDEV 31 and 32 may be used as cache disks.

The connection section 26 mutually connects the CHA 21A, CHF 21B, each DKA 22, the cache memory 24, and the shared memory 25. The connection section 26 can be constituted as a high-speed bus such as an ultrafast crossbar switch or similar that performs data transmission by means of a high-speed switching operation, for example.

The disk unit 30 includes a plurality of disk storage devices 400 arranged in the form of an array. A device such as a hard disk, flexible disk, magnetic tape, semiconductor memory, or optical disk, for example, can be employed as the disk storage device 400. LDEV 31 and 32 are provided in the storage area of the disk storage device 400. Further, the LDEV 32 indicated by the dotted lines are LDEV that reflect a state where the LDEV 42 of the second storage control system 40 is introduced to the first storage control system 600. In other words, the LDEV (hereinafter called the 'external LDEV') 42 that is outside from the perspective of the first storage control system 600 is supplied to the host device 10 as the internal LDEV 32 of the first storage control system 600.

The SVP 23 is an information-processing terminal (a notebook personal computer, for example) for implementing the maintenance or management of the first storage control system 600. A management console (not shown), for example, is connected to the SVP 23. The SVP 23 monitors the generation of faults within the first storage control system 600 and displays such faults on the console, and designates the closure processing of the disk storage device 400 on the basis of commands from the console. Further, the SVP 23 is able to communicate with the second storage control system 40 via the communication network CN4. The SVP 23 is also able to communicate with a key management server 8 and a storage management terminal 6 via a communication network CN3. The key management server 8 and storage management terminal 6 will be described subsequently.

The second storage control system 40 may be constituted in the same manner as the first storage control system 600 or may be constituted more simply than the first storage control system 600. For example, the second storage control system 40 comprises a CHF 217 with a communication port 41 and one or a plurality of disk storage devices 401, for example. The LDEV 42 may be provided in the storage area of the disk storage devices 401. The second storage control system 40 is connected to the first storage control system 600 via the FC-SW 2 and the LDEV (that is, the external LDEV) 42 of the second storage control system 40 is treated as the internal LDEV 32 of the first storage control system 600.

An overview of the storage system 1 according to this embodiment was provided above. Further, the reference number 801 represents a maintenance/management system for maintaining or managing the first storage control system 600 and comprises the SVP 23 and storage management terminal 6, for example.

Figure 2:
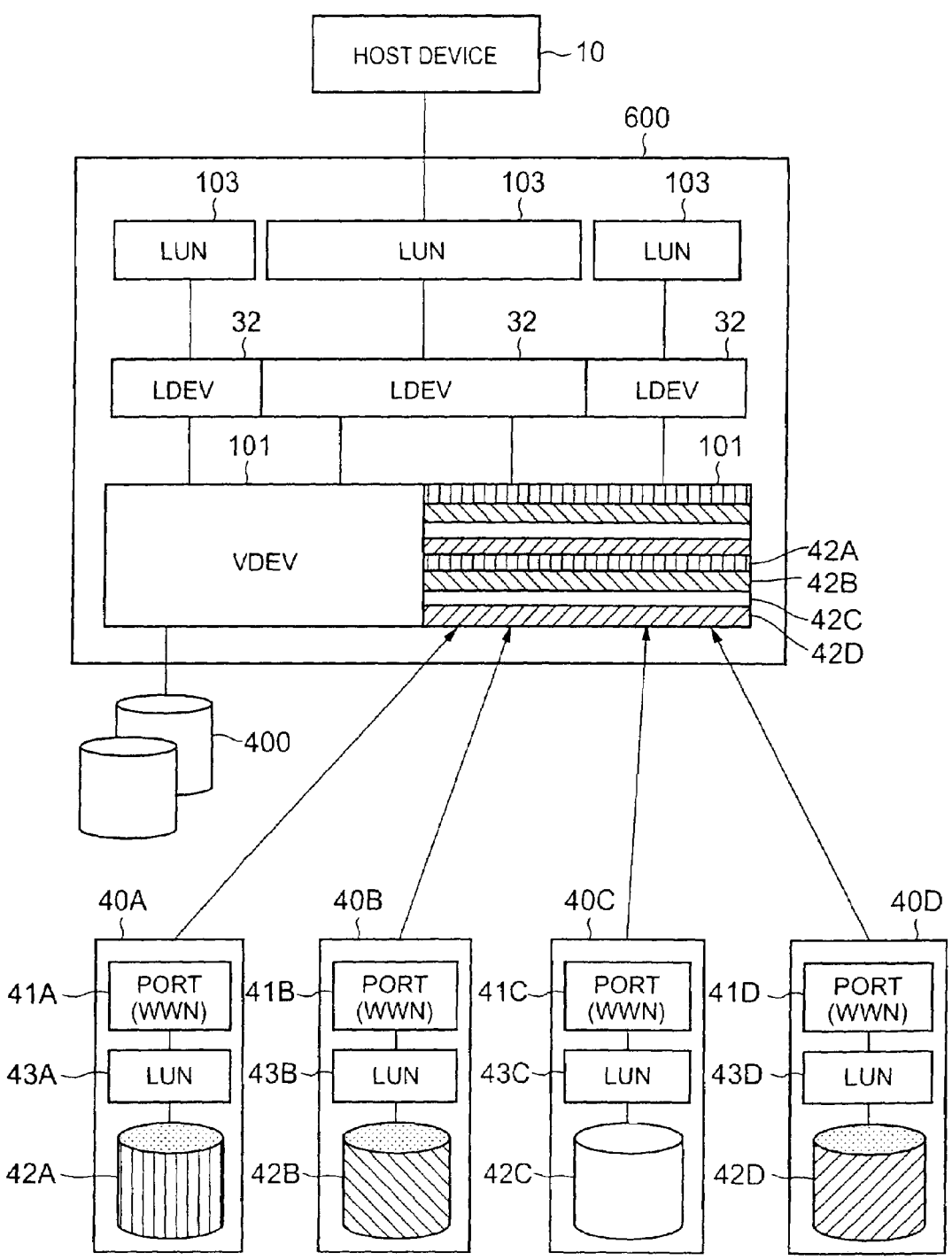
FIG. 2 is a schematic diagram showing the logical connection structure of a first storage control system 600 and a second storage control system 40.

FIG. 2 is a schematic diagram showing the logical connection structure of the first storage control system 600 and the second storage control system 40.

As illustrated, the first storage control system 600 is a three-layer storage hierarchy that comprises, in order starting from the bottom layer, a VDEV 101, LDEV 31 and LUN 103.

VDEV 101 is a Virtual Device positioned at the lowest point of the logical storage hierarchy. VDEV 101 virtualizes physical storage resources and is able to apply a RAID constitution. That is, a plurality of VDEV 101 can be formed from one disk storage device 400 (slicing) and one VDEV 101 can be formed from a plurality of disk storage devices 400 (striping). The VDEV 101 shown on the left-hand side of FIG. 2 virtualizes the disk storage device 400 in accordance with a predetermined RAID constitution, for example.

On the other hand, the VDEV 101 shown on the right-hand side of FIG. 2 maps the external VDEV 42 supplied by the disk storage device 401 of the second storage control system 40 with VDEV 101 by using a mapping table Tm described subsequently and can be used as an internal LDEV 32 of the first storage control system 600. In the example shown in the figure, the VDEV 101 is constituted by striping four external LDEV 42A to 42D that exist in four second storage control systems 40A to 40D. By specifying LUN (Logical Unit Numbers) 43A to 43D via respective communication ports 41A to 41 D, each of the external LDEV 42A to 42D can be accessed individually. A WWN (World Wide Name), which is unique identification information, is allocated to each of the communication ports 41A to 41D. For this reason, if the first storage control system 600 designates a WWN and LUN combination to the FC-SW2, the external LDEV 42 belonging to the LUN included in this combination is visible via the FC-SW2. Further, when a plurality of the LDEV belonging to a LUN is present, a plurality of LDEV is supplied by the first storage control system 600 to the host device 10 as one logical storage device.

Further, internal LDEV 32 are provided above the VDEV 101. The internal LDEV 32 is a logical device that virtualizes a virtual device (VDEV). A connection can be made from one VDEV 101 to two internal LDEV 32 or from a plurality of VDEV 101 to one internal LDEV 32. The internal LDEV 32 can be accessed via respective LUN 103. Therefore, in this embodiment, by connecting the external LDEV 42 to an intermediate storage level (VDEV 101 and internal LDEV 32) located between the LUN 103 and the external LDEV 42, the external LDEV 42 can be utilized as one internal LDEV 32 of the first storage control system 600.

Figure 3:
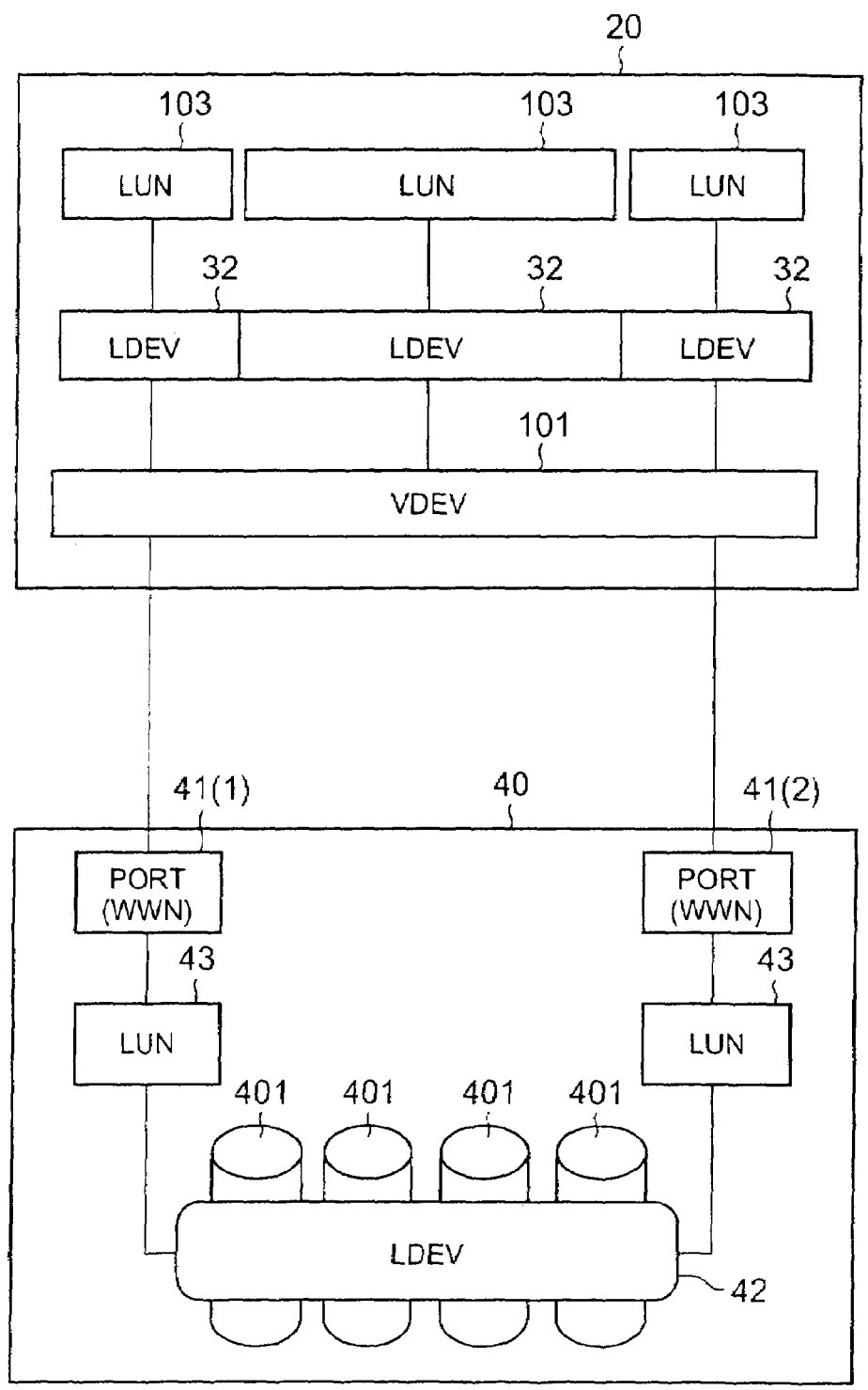
FIG. 3 is a schematic diagram showing an overview of another logical constitution.

FIG. 3 is a schematic diagram of another logical connection structure.

In FIG. 3, the external LDEV 42, which is provided by the disk storage devices 401 of the second storage control system 40, has an alternate path constitution comprising a plurality of paths. For example, the external LDEV 42 can be accessed via two paths (access data paths). One path extends from the first communication port 41(1) to the external LDEV 42 via the LUN 43, while the other path extends from the second communication port 41 (2) to the external LDEV 42 via another LUN 43. Therefore, supposing that either path is unusable due to a fault or the like, the external LDEV 42 can be accessed via the other path. When access via a plurality of paths is possible, required data protection and so forth is performed so that, while data is being used via one path, data is not updated by gaining access via the other path.

Further, in the example shown in FIG. 3, the first storage control system 600 uses the external LDEV 42 as an internal LDEV 32 by mapping the storage resources (external LDEV 42) of the second storage control system 40 to its own VDEV 101. Further, a plurality of LDEV 32 is established on one VDEV 101 and the external LDEV 42 is mapped to the VDEV 101 via a plurality of paths. The host device 10 identifies only the LUN 103 (and consequently performs identification as far as the internal LDEV 32), the structure below the LUN 103 being hidden from the host device 10. The plurality of internal LDEV 32 use the same VDEV 101 and the VDEV 101 is connected to the same external LDEV 32 via a plurality of paths. Therefore, in the example shown in FIG. 3, the alternate path structure of the second storage control system 40 is used, whereby the redundancy of the first storage control system 600 can be improved.

FIG. 4 shows a structural example of the mapping table stored in the shared memory 25.

VDEV identification information (hereinafter represented by 'VDEV#') for identifying each VDEV 101 and information relating to the external LDEV 42 (hereinafter called 'external device information') are associated in the mapping table Tm. External device information includes system identification information, the storage capacity of the external LDEV 42, information indicating the device type (as a tape-system device or disk-system device and so forth), for example, and information on the path to the external LDEV 42, for example. The system identification information is information including the vendor ID, machine type, and manufacturing number of the second storage control system 40, for example. The path information can be constituted comprising identification information (WWN) specific to the communication port 41 and the LUN 4, for example. Further, the system identification information and WWN, and so forth shown in FIG. 4 are values for the sake of expediency in the description and have no particular meaning. Further, three path-information items are associated with the VDEV 101 of VDEV number '3' shown at the bottom of FIG. 4. That is, the external LDEV 42 that is mapped with the VDEV 101 (#3) comprises an alternate path structure that contains three paths, this alternate path structure being identified and mapped to the VDEV 101 (#3). Since it has been proven that the same storage area can be accessed via any of the three paths, even when a fault or similar is generated in any one or two paths, the desired data can be accessed via the remaining normal path.

By adopting the mapping table Tm shown in FIG. 4, one or a plurality of external LDEV 42 can be mapped with respect to one or more internal VDEV 32 in the first storage control system 600.

Furthermore, in this embodiment, at least device identification information in the above external device information is registered in the mapping table Tm only when registration in the mapping table Tm is allowed. The decision regarding whether to allow registration of device identification information in the mapping table Tm is determined by using key information that will be described subsequently. This is described in detail below.

Figure 5:
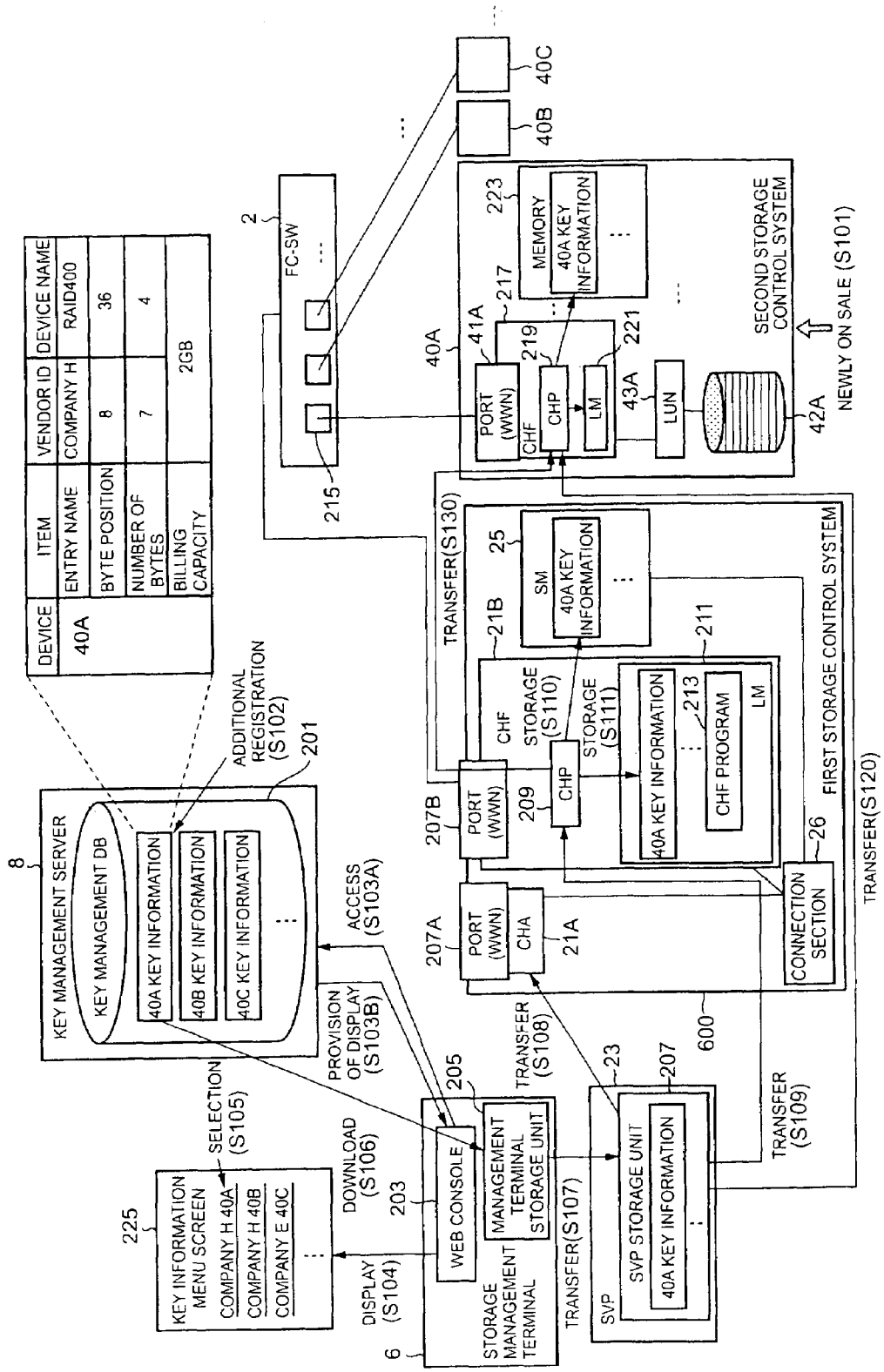
FIG. 5 shows the flow of processing up until key information is introduced to the first storage control system 600.

FIG. 5 shows the flow of processing up until key information is introduced to the first storage control system 600.

The key management server 8 is equipped with a key management database (hereinafter abbreviated to 'key management DB') 201. One or a plurality of key information items corresponding with the second storage control system 40 of one or a plurality of types are registered in the key management DB 201. When a new-type second storage control system 40 is on the market, key information corresponding with the new type of second storage control system 40 is newly registered in the key management DB 201. Here, the 'type' of the second storage control system 40 is intended to include at least one vendor, device name and device version, for example. Therefore, if at least one of the vendor, device name and device version of two second storage control systems 40 are different, for example, the types of these two second storage control systems 40 are then different from one another.

Key information is information indicating where a particular information item is written in the control system information outputted by the second storage control system 40 of the corresponding type. More specifically, for example, key information records the particular entry names for a vendor ID and device name of the control system information and records how many bytes are written from a particular byte position. As illustrated, key information may therefore include the billing capacity. The billing capacity is the storage capacity that is usable when key information is purchased in the storage capacity of the second storage control system 40 corresponding to the key information.

The storage management terminal 6 is an information processing terminal (personal computer or workstation, for example) for managing the first storage control system 600 via the SVP 23. The storage management terminal 6 is a terminal used by a client accessing the second storage control system 40 via the first storage control system 600, for example. The storage management terminal 6 comprises the hardware resources of a CPU and management terminal storage unit (memory or hard disk, for example) 205, and software such as an OS (operating system) and a WEB console 203 that runs on the OS, or the like, for example.

The FC-SW 2 is provided with a plurality of connection ports 215, the first storage control system 600 and the second storage control system 40 being connected to each connection port 215.

The flow of processing up until key information has been downloaded from the key management server and stored in the first storage control system 600 will now be described with reference to FIG. 5.

For example, a case where a second storage control system 40A newly goes on sale (S101), key information corresponding with the second storage control system 40A (hereinafter called '40A key information' by using a reference numeral) is newly registered in the key management DB 201 (S102).

The WEB console 203 of the storage management terminal 6 accesses the key management server 6 in accordance with operation of the client (S103A). In response to this access, the key management server 8 provides the storage management server 6 with a key information menu screen 225 for accepting the selection of desired key information among one or a plurality of key information items registered in the key management DB 201 (S103B).

The WEB console 203 displays the provided key information menu screen 225 on the display screen of the storage management terminal 6 (S104). Thereafter, when key information desired by the client is selected from the one or the plurality of key information items displayed on the key information menu screen 225 (which is '40A key information' hereinafter) is selected (S105), the WEB console 203 notifies the key management server 8 that the selected key information is 40A key information. In response to this notification, the key management server 8 downloads 40A key information selected by the client from the key management DB 201 to the storage management server 6 (S106).

The storage management terminal 6 stores the downloaded 40A key information in the management terminal storage unit 205. If one or a plurality of other key information items have been downloaded in the past, the one or the plurality of other key information items may be stored cumulatively in the management terminal storage unit 205.

The storage management terminal 6 reads the 40A key information stored in the management terminal storage unit 205 and then transfers the 40A key information to the SVP 23(S107).

The SVP 23 stores the 40A key information thus received from the storage management terminal 6 in the SVP storage unit (memory or hard disk, for example) 207. If one or a plurality of other key information items have been received in the past, the one or the plurality of other key information items may be stored cumulatively in the SVP storage unit 207 as indicated by the dotted lines.

The SVP 23 reads the 40A key information stored in the SVP storage unit 207 and then transmits this 40A key information to the CHA 21A and CHF 21B via an internal communication network such as a LAN (S108 and S109).

The channel processor (a microprocessor, for example, hereinafter called a 'CHP') 209 mounted in the CHF 21B stores the received 40A key information in the SM 25 via a connection section 26 (S110). If one or a plurality of other key information items have been received in the past, this one or the plurality of other key information items may be stored cumulatively in the SM 25 as indicated by the dotted lines. The processing of S110 may be performed by the CHP (not shown) mounted in the CHA 21A instead of or in addition to the CHF 21B.

The CHP 209 mounted in the CHB 21 also stores the received 40A key information in the local memory (sometimes abbreviated to 'LM' hereinafter) 211 that is mounted in the CHF 21B (S111). If one or a plurality of other key information items have been received in the past, the one or the plurality of other key information items may be stored cumulatively in the LM 211 as indicated by the dotted lines.

According to the flow of the serial processing above, 40A key information items desired by the client among the one or the plurality of key information items registered in the key management DB 201 are stored in the first storage control system 600.

Further, the 40A key information is transferred to the second storage control system 40A and may be shared between the first storage control system 600 and the second storage control systems 40A to 40C.

More specifically, for example, the CHP 209 of the CHF 21B reads 40A key information from the LM 211 or SM 25 and transmits this 40A key information to the second storage control systems 40A to 40C connected to the FC-SW 2 via the communication port 207B and the FC-SW 2 (that is, via a Fibre Channel). In this case, for example, the CHP 219 mounted in the CHF 217 of the second storage control system 40A stores the 40A key information thus received in the memory (SM, for example) 223, which is in a separate location from the CHF 217, or in the LM 221 mounted in the CHF 217.

Further, the SVP 23 reads 40A key information stored in the SVP storage unit 207 and transmits this 40A key information to the second storage control systems 40A to 40C via a communication network CN4, for example (See FIG. 1, Ethernet (registered trademark), for example). In this case, for example, the CHP 219 mounted in the CHF 217 of the second storage control system 40A stores the received 40A key information in the memory (SM, for example) 223, which is in a separate location from the CHF 217, or in the LM 221 mounted in the CHF 217.

Furthermore, as will be described subsequently, the CHP 209 contained in the CHF (hereinafter the 'first CHF') 21B mounted in the first storage control system 400 receives control system information from the CHF (hereinafter the 'second CHD') 217 mounted in the second storage control system 40A, and, at this time, judges whether a VDEV# and control system information may be associated by using key information stored in the LM 211 or SM 25 (or controls which information items among the plurality of information items included in the control system information are to be accepted).

Key information is in a predetermined format. More specifically, for example, it is determined beforehand in which location in the key information information of a particular type is to be written.

Further, the CHP 209 judges whether to allow the association of VDEV# and the control system information received from the second storage control system 40 by using key information by means of a microprogram (hereinafter 'CHP program') 213 that is read from the LM 211. The CHP program 213 is created based on the constitution of the key information. For example, it is determined beforehand in which location in the key information information of a particular type is to be written. Therefore, in order that the CHP program 213 acquire the entry names of a vendor ID and device name, the byte position and number of bytes, the acquisition of the vendor ID and device name is determined beforehand from control system information in accordance with the location in the key information to be referenced and the acquired byte position and number of bytes. As a result, for example, even when the type of the second storage control system 40 connected to the FC-SW2 is newly added, the constitution of key information corresponding with the added type of second storage control system 40 is the same. Therefore, there is no need to update the CHP program 213.

The flow of processing in which the first storage control system 600 (first CHF21B, for example) uses one or a plurality of key information items stored in the LM 211 or SM 25 to register control system information received from the second storage control system 40A in the mapping table Tm will be described below with reference to FIG. 6.

The first CHF 21B issues an inquiry command to the FC-SW 2 (step S0A). In response to this inquiry command, the FC-SW2 transmits the required login information (WWN of the communication port 41 connected to the FC-SW2, for example), which is required in order to log on to the second storage control system 40 connected to the FC-SW 2, to the first CHF 21B (S0B).

The first CHF 21B registers the required login information for each of the second storage control systems 40 received from the FC-SW 2 in the LM 211 (S0C).

In a case where a request to associate the VDEV 101 and the external LDEV 42, for example, is received from the SVP 23, the first CHF 21B uses the required login information registered in the LM 211 to log on (S1) to the second storage control system 40A via the initiator port (207B) of the first CHF21B. The login is complete when the CHF (hereinafter the second CHF) 217 of the second storage control system 40 returns a response to the login from the first CHF 21B.

Next, the first CHF 21B transmits an inquiry command established according to the SCSI (Small Computer System Interface), for example, to the second CHF 217 (S3). An inquiry command as it is meant here is used in order to clarify the type and constitution of the device to which the inquiry is addressed and hence the source issuing the inquiry command is able to ascertain the physical structure of the inquiry destination device.

For example, the second CHF 217 that has received the inquiry command acquires control system information relating to the second storage control system 40A from the memory 223 or the like, and transmits this control system information to the first CHF 21B (S4) and returns a predetermined response (S5). Further, control system information that is transmitted here includes, for example, the vendor ID, device name, and product number of the second storage control system 40A, the WWN of the communication port 41A that receives the inquiry command, the LUN belonging to the WWN, the number of the LDEV belonging to the LUN, and the type of disk comprising the LDEV.

The first CHF 21B judges (S6) whether to allow the received control system information to be mapped with the VDEV# by using key information that is selected from one or a plurality of key information items registered in the SM 25 or LM 211 by means of the read CHP program 213. More specifically, for example, the first CHF 21B determines the entry names of the vendor ID and device name, the byte position and number of bytes from the selected key information. Next, the first CHF 21B ascertains the data content according to the byte position and number of bytes thus ascertained, from the received control system information. The first CHF 21B then judges whether there is compatibility between the data content and the entry names of the device name and vendor ID thus ascertained (hereinafter 'key/system compatibility judgment').

When, as a result of the key/system compatibility judgment of S6, a negative result is obtained (N in S7), the first CHF 21B performs the processing of S6 (N in S8) by using one or more other key information items registered in the SM 25 or LM 211. Further, even when the first CHF 21B executes S6 by using all the key information registered in the SM 25 or LM 211, when a negative result is obtained (N in S7 and Y in S8), the association of control system information with VDEV# is rejected (S9). In this case, for example, the first CHF 21B may erase the received control system information. In addition, for example, the first CHF 21B may cause the storage management terminal 6 to display information encouraging the purchase of 40A key information corresponding with the second storage control system 40A via the SVP 23 (S10). The information encouraging such action may be a message instructing the purchase of key information, for example, or may be only part of the received control system information with the part for which compatibility with key information was not obtained removed. In the latter case, only part of the control system information is displayed, and it can therefore be inferred that the client must purchase key information.

Furthermore, when, as a result of the key/system compatibility judgment of S6, an affirmative result is obtained (Y in S7), the first CHF 21B registers the received control system information (system identification information including the vendor ID, device name, and product number of the second storage control system 40A, as well as the WWN, LUN, and disk type, for example) at predetermined points in the mapping table Tm (locations corresponding to the VDEV# designated by the client, for example) (S11).

Next, the first CHF21B sends (S12) an inquiry regarding the storage capacity of the external LDEV 42 belonging to the LUN in the received control system information (a read capacity command based on the SCSI protocol, for example) to the second CHF 217. The second CHF 217 references storage capacity information registered in the memory 223 (the total storage capacity of one or more external LDEV 42 belonging to the LUN, for example), returns the storage capacity that was the subject of the inquiry (that is, the storage capacity of the external LDEV 42) to the first CHF 21B (S13), and returns a response (S14). The first CHF 21B registers the received storage capacity at a predetermined point in the mapping table Tm (location corresponding with the VDEV# designated by the client, for example) (S15).

An association between the VDEV#, the control system information, and the storage capacity is made by the processing above. According to the above description, the key information is one type of information filter. Of a plurality of information items included in the control system information inputted to the information filter, only the information items that have been able to pass through the information filter are registered in the mapping table Tm. Stated from this perspective, when, as a result of the key/system compatibility judgment of S6, a negative result is obtained, the vendor ID and device name among the information items in the control system information are unable to pass through the key information constituting the information filter. When, on the other hand, an affirmative result is obtained, all the information items in the control system information, including the vendor ID and device name are able to pass through the key information.

Furthermore, the processing of S6 to S9 above may be performed by the second CHF 217 constituting the login destination of the first CHF 21B in place of or in addition to the first CHF 21B. An example of the flow of processing performed in this case will be described below with reference to FIG. 7.

FIG. 7 shows an example of the flow of processing in a case where a first CHF 21B judges whether control system information may be associated with VDEV# by using one or a plurality of key information items stored in LM 221 or memory 223.

The first CHF 21B executes the processing of S0A to S3 above (S20A to S23).

The second CHF 217 judges whether or not to allow control system information stored in the memory 223, for example, to be mapped with the VDEV# by using key information selected from one or a plurality of key information items registered in the memory 223 or LM 221 (S24). More specifically, for example, the second CHF 217 determines the entry names of the vendor ID and device name, the byte position and number of bytes from the selected key information. Next, the second CHF 217 determines the data content according to the byte position and number of bytes thus determined, from the control system information. The second CHF 217 then executes the above key/system compatibility judgment by using the data content thus ascertained and the entry names of the device name and vendor ID.

When, as a result of the key/system compatibility judgment in S24, a negative result is obtained (N in S27), the second CHF 217 performs the processing of S24 by using one or more other key information items registered in the memory 223 or LM 221 (N in S28). The second CHF 217 then rejects the association of control system information with VDEV#

(S29) when a negative result is obtained (N in S27, Y in S28) even when S24 is executed by using all the key information items registered in the memory 223 or LM 221. In this case, for example, the second CHF 21B may send all the control system information to the first CHF 21B or may send information items other than the vendor ID and device name for which there is no compatibility (WWN and LUN, and so forth, for example) to the first CHF 21B. Even when such information items are transmitted, this does not mean that all the necessary external device information is registered in the mapping table Tm, and, consequently, there is no association between the VDEV# and external device information.

Thereafter, the second CHF217 may perform the above S10.

When, as a result of the key/system compatibility judgment of S24, an affirmative result is obtained (Y in S27), the second CHF 21B executes S4 and S5 above (S31 and S32). Thereafter, processing that is the same as S11 to S15 is performed (S33 to S37).

Furthermore, when, after the mapping of the VDEV# and the external system information, the host device 10 inputs and outputs data to and from the external LDEV 42 via the first storage control system 600, address conversion and so forth is performed by referencing another table (described subsequently).

The inputting and outputting of data between the first storage control system 600 and the second storage control system 40 will now be described with reference to FIGS. 8 to 10. First, when data is written, the description will be based on FIGS. 8 and 9. FIG. 8 is a schematic diagram showing the processing when data writing takes place. FIG. 9 is an explanatory diagram showing the flow of the processing in FIG. 8 by means of the relationship with various tables.

The host device 10 is able to write data to the internal LDEV31 or 32 supplied by the first storage control system 600. For example, the host device 10 can be set to access only a specified internal LDEV 32 by means of a method that involves zoning, which establishes a virtual SAN subnet in the SAN, and LUN masking, whereby the host device 10 keeps a list of accessible LUN, and so forth.

When the internal LDEV to which the host device 10 is to write data is the internal LDEV31 connected to the internal disk storage device 400 via the VDEV 101, data is written by means of normal processing. That is, data from the host device 10 is temporarily stored in the cache memory 24 and then stored from the cache memory 24 at a predetermined address of the predetermined disk storage device 400 via the DKA 22. At such time, the DKA 22 converts the logical address into a physical address. Further, in the case of a RAID constitution, the same data is stored in a plurality of disk storage devices 400.

Figure 8A:
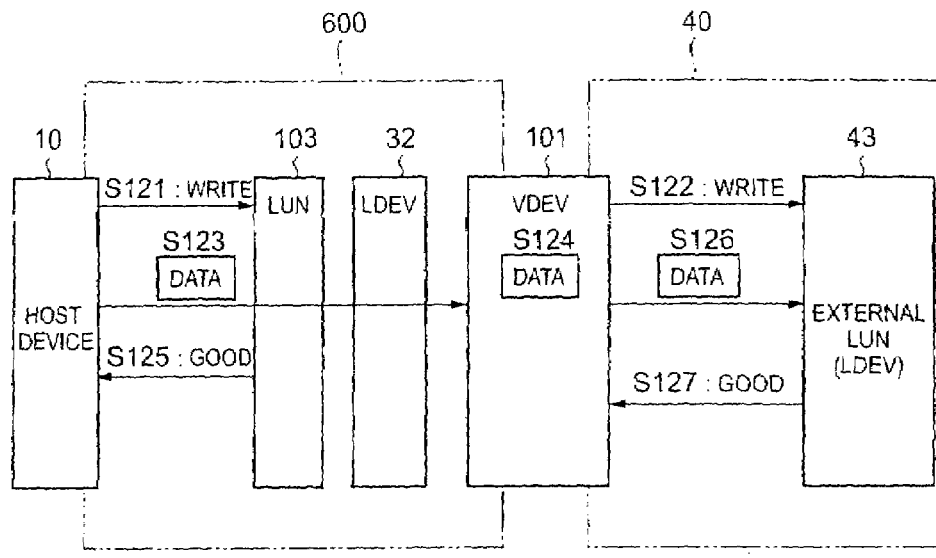
FIG. 8 is a conceptual view of a case where data is written to an external LDEV.
Figure 8B:
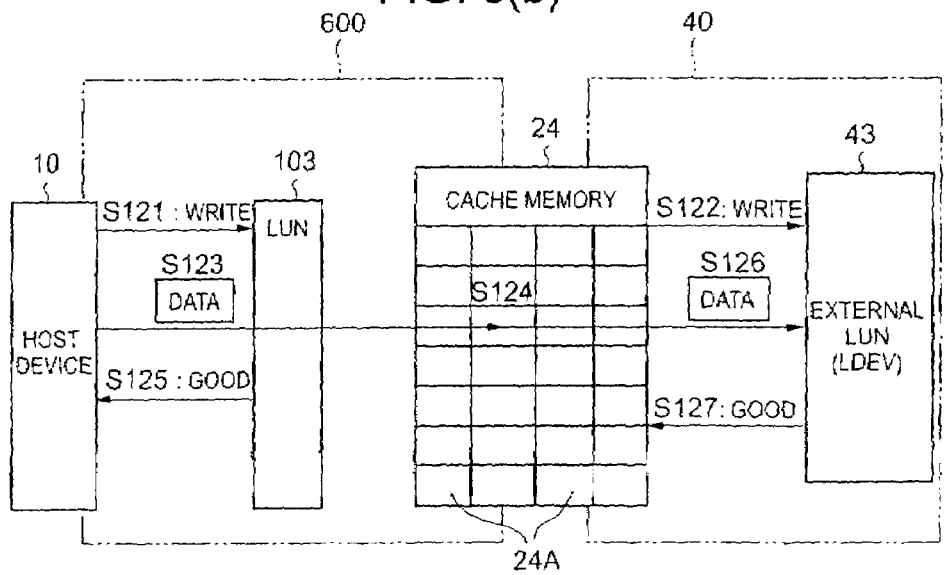

On the other hand, when the internal LDEV to which the host device 10 is to write data is the internal LDEV 32 connected to the external storage device 42 via the VDEV 102, data is written according to the flow shown in FIG. 8. FIG. 8(a) is a flow diagram at whose center the storage level is shown and FIG. 8(b) is a flow diagram at whose center usage of the cache memory 24 is shown.

The host device 10 specifies the LDEV number that specifies the write-destination internal LDEV 32 and the WWN that specifies the communication port 207A for accessing the internal LDEV 32 and issues a write command (Write) (S121). Upon receipt of the write command from the host device 10, the first storage control system 600 generates a write command for transmission to the second storage control system 40 and transmits this write command to the second storage control system 40 (S122). The first storage control system 600 updates write-destination address information and so forth in the write command received from the host device 10 in accordance with the external LDEV 42 and generates a new write command.

Next, the host device 10 transmits data to be written to the first storage control system 40 (S123). Data that is received by the first storage control system 600 is transferred (S126) from the internal LDEV 32 to the external LDEV 42 via the VDEV 101 (S124). Here, the first storage control system 600 returns (S125) a write completion response (Good) to the host device 10 when the data from the host device 10 has been stored in the cache memory 24. The second storage control system 40 transmits (S126) a write completion report to the first storage control system 600 when the data has been received from the first storage control system 600 (or when writing to the storage device 42 is complete). That is, the time at which the first storage control system 600 reports write completion to the host device 10 (S125) and the time when data is actually stored in the storage device 42 are different (asynchronous method). Therefore, the host device 10 is able to execute other processing when released from data write processing before data is actually stored in the storage device 42.

Now refer to FIG. 8(b). A multiplicity of subblocks 24A is provided in the cache memory 24. The first storage control system 600 converts a logical block address designated by the host device 10 to a subblock address and stores data at a predetermined point in the cache memory 24 (S124).

Now refer to FIG. 9. As aspect in which data is converted by using various tables will now be described. As shown at the top of FIG. 9, the host device 10 transmits data by designating a LUN and logical block address (LBA) to a predetermined communication port 207A. The first storage control system 600 converts data (LUN+LBA) inputted for usage by the internal LDEV 32 into VDEV 101 data on the basis of first conversion table T1 shown in FIG. 9(a). First conversion table T1 is a LUN-LDEV-VDEV conversion table for converting data designating an internal LUN 103 into VDEV 101 data. This table T1 is stored in the SM 25, for example (the same is true of tables T2 and T2a described subsequently). Table T1 is constituted by an association between a LUN, the number of the LDEV 32 corresponding with the LUN 103 (LDEV#) and maximum slot number, and the number of the VDEV 101 corresponding with the LDEV 102 (VDEV#) and maximum slot number, and so forth, for example. Further, although not illustrated, the association of a particular LBA of a particular LDEV 32 with a particular subblock of a particular slot in the cache memory 24 may also be registered in table T1. When the first storage control system 600 (the first CHF21B, for example) references table T1, the data (LUN+LBA) from the host device 10 is converted into VDEV 101 data (VDEV#+ SLOT#+SUBBLOCK#).

Next, the first storage control system 600 converts the VDEV 101 data into data to be transmitted to and stored in the external LUN (external LDEV 42) of the second storage control system 40 by referencing the second conversion table T2 shown in FIG. 9(b). The second conversion table T2 associates the number of the VDEV 101 (VDEV#), the number of the initiator port for transmitting data from the VDEV101 to the second storage control system 40, the WWN specifying the data-transfer-destination communication port 41, and the LUN accessible via this communication port, for example. The first storage control system 600 converts destination information for the data to be stored into the format initiator port number # +WWN+LUN+LBA on the basis of the second conversion table T2. The data for which the destination information has been changed in this manner reaches the designated communication port 41 via the communication network CN2 from the designated initiator port. The data is then stored in a predetermined location in the external LDEV 42 that can be accessed by the designated LUN 43. Because the external LDEV 42 is built virtually in a plurality of disk storage devices 401, the data address is converted to a physical address and stored at a predetermined address of a predetermined disk.

FIG. 9(*c*) shows another second conversion table T2*a*. This conversion table T2*a* is used when a stripe or RAID constitution is applied to the VDEV 101 that originates from the external storage device 42. The conversion table T2*a* is constituted by an association between a VDEV number (VDEV#), the stripe size, the RAID level, a number for identifying the second storage control system 40 (SS#(storage system number)), an initiator port number, the WWN and number of the LUN 43 of the communication port 41. In the example shown in FIG. 9(*c*), one VDEV 101 constitutes RAID1 by using a total of four external storage control systems specified by SS# (1, 4, 6, 7). Further, three LUN (#0, #0, #4) allocated to SS#1 are established in the same device (LDEV#). Further, the volume of LUN#0 has an alternate-path structure with two access data paths. Therefore, in this embodiment, because VDEV 101 is constituted by a plurality of logical volumes (LDEV) that are external, the striping or RAID functions can be added and then supplied to the host device 10.

The flow of the processing in a case where data is read from the external LDEV 42 of the second storage control system 40 will now be described with reference to FIG. 10.

First, the host device 10 transmits (S131) a data read command to the first storage control system 600 by designating the communication port 207A. Upon receipt of the read command, the first storage control system 600 generates a read command for reading the requested data from the second storage control system 40. The first storage control system 600 then transmits the generated read command to the second storage control system 40 (S132). The second storage control system 40 reads the requested data from the external LDEV 42 in accordance with the read command received from the first storage control system 600, transmits this data to the first storage control system 600 (S133), and then reports on the normal completion of the reading (S135). As shown in FIG. 10(*b*), the first storage control system 600 stores data received from the second storage control system 40 in a predetermined location of the cache memory 24 (S134).

The first storage control system 600 reads data stored in the cache memory 24 and performs address conversion before transmitting the data to the host device 10 via the LUN 103 and so forth (S136) and issuing a read completion report (S137). In the serial processing when this data is read, the conversion operation mentioned in conjunction with FIG. 9 is executed in reverse order.

Figure 10A:
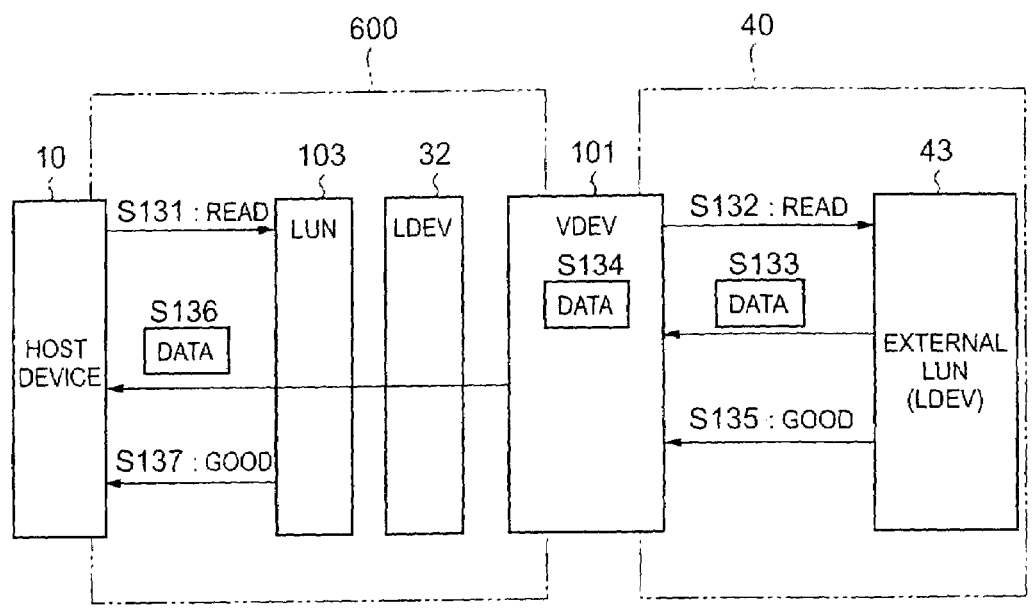
FIG. 10 is a conceptual view of a case where data is read from an external LDEV.
Figure 10B:
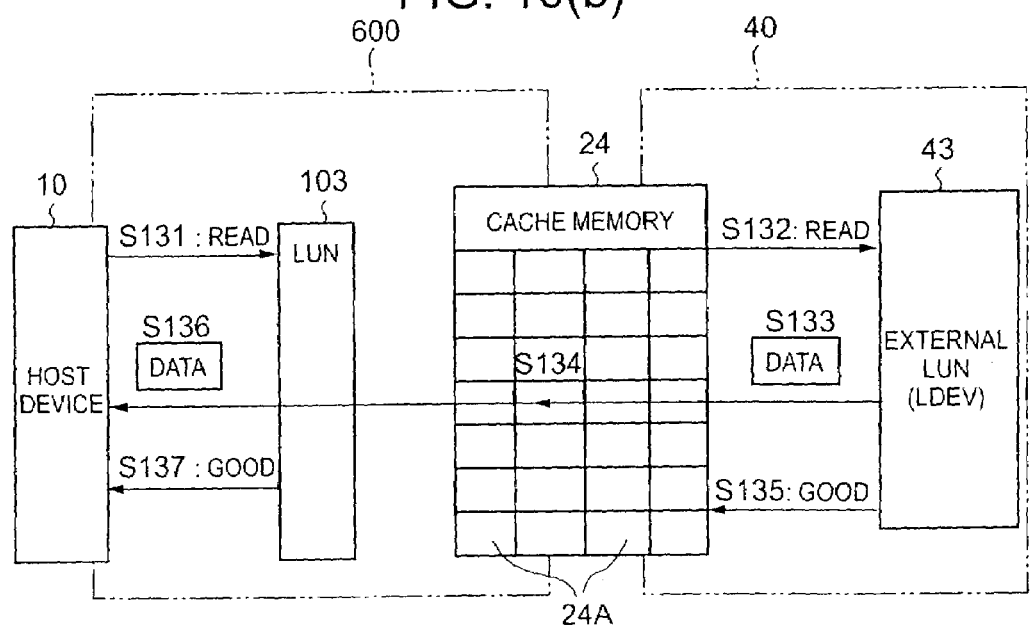

FIG. 10 shows how data is read from the second storage control system 40 in accordance with the request from the host device 10 and then saved in the cache memory 24. However, the process is not limited to the aforementioned process. All or part of the data stored in the external LDEV 42 can also be stored in the cache memory 24 beforehand. In this case, data can be read directly from the cache memory 24 and transmitted to the host device 10 in response to a read command from the host device 10.

According to the embodiment above, the CHP program 213 of the CHP 209 mounted in the first CHF 21B is created on the basis of the constitution of the key information. Further, the key information is in a set format irrespective of the type of the second storage control system 40 (that is, it is established beforehand in which location in the key information information of a particular type is to be written). For this reason, once the CHP program 213 has been created on the basis of the constitution of the key information, even when the type of the second storage control system 40 connected to the FC-SW 2 is newly added, for example, the constitution of the key information corresponding to the added type of second storage control system 40 is the same, which obviates the need to change the CHP program 213.

Furthermore, according to the above constitution, the key information is a type of information filter, and, hence, of the plurality of information items included in control system information inputted to the information filter, only the information items that have been able to pass through the information filter are associated with the VDEV 101. As a result, the host device 10 is able to access the external LDEV 42 in the second storage control system 40. In other words, when key information corresponding to the type of second storage control system 40 comprising the external LDEV 42 to be accessed is not present in the first storage control system 600, the host device 10 is unable to access the external LDEV 42. Consequently, a high level of security is preserved.

Unlike the constitution above, Patent Document 2 (Japanese Patent Application Laid Open No. 2001-337850) only reconstitutes the logical volume of an internal disk storage device installed under the direct control of the storage control system in sector units. The external LDEV 42 is therefore not handled as a virtual internal LDEV 32 as per the present embodiment.

Further, according to the above embodiment, key information that is downloaded from the key management server 8 is stored in at least one of the SVP storage unit 207 of the SVP 23, the SM 25 and the LM 211. For example, when key information is stored in the SVP storage unit 207 of the SVP 23, key information is easily transmitted to a plurality of storage control systems. In other words, key information is easily shared between a plurality of storage control systems. When key information is stored in the SM 25 or LM 211, key information may be read from the SM 25 or LM 211 in processing that employs key information. The processing may therefore be executed at high speed in comparison with a case where key information is captured from the SVP storage unit 207 of the SVP 23.

Further, several modified examples may be considered for the above embodiment, which will be described in detail below.

(1) FIRST MODIFIED EXAMPLE

Figure 11:
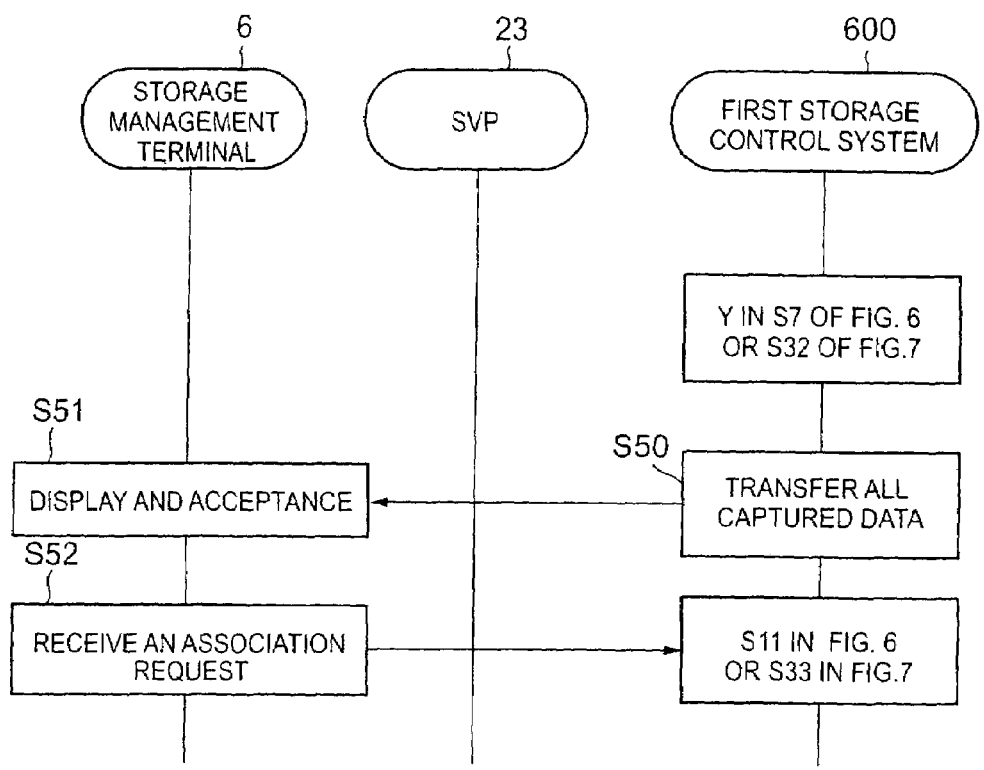
FIG. 11 shows an example of the flow of processing according to a first modified example of this embodiment.

FIG. 11 shows an example of the flow of processing according to the first modified example of this embodiment.

Figure 6:
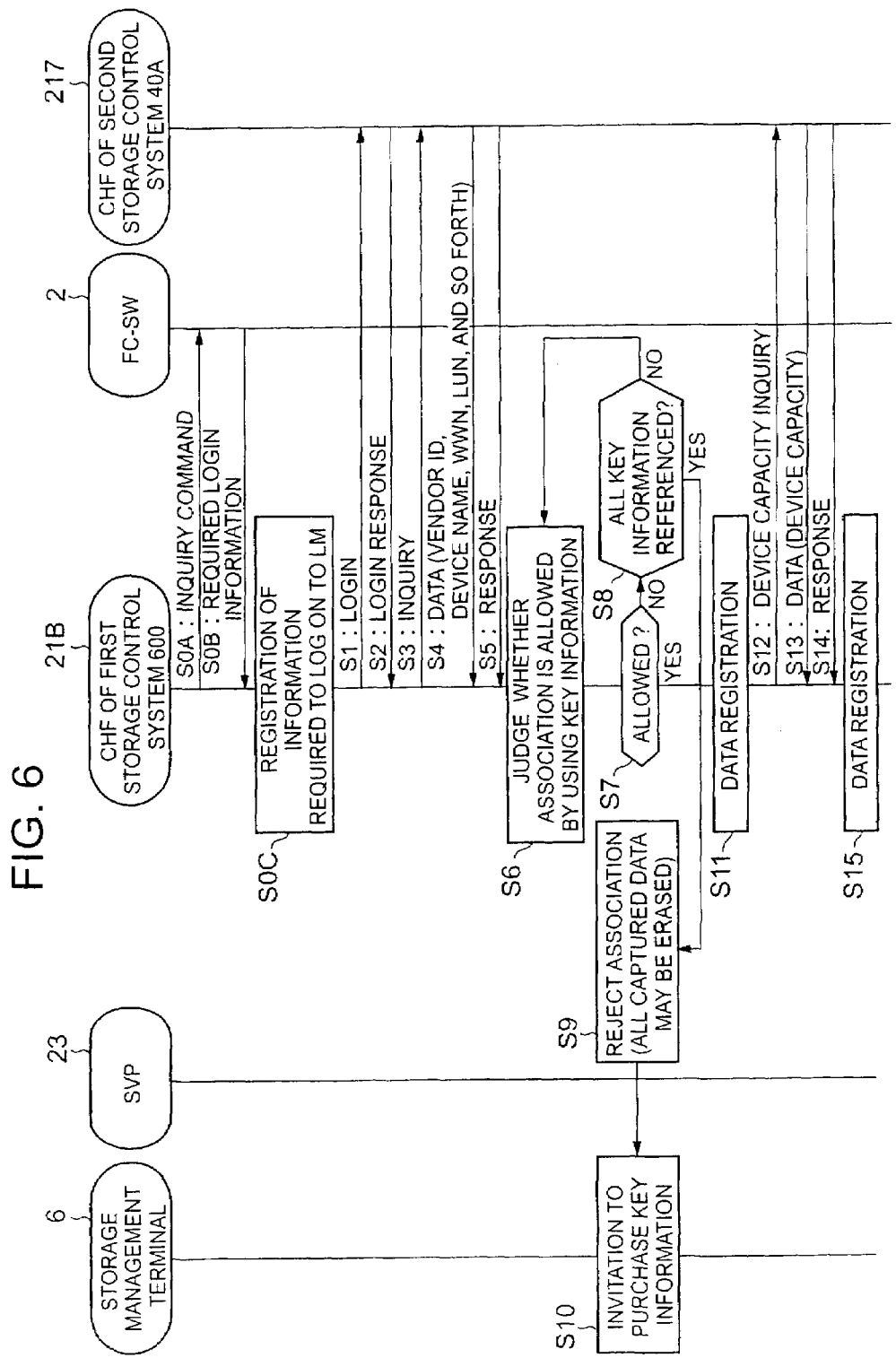
FIG. 6 shows the flow of processing in which the first storage control system 600 registers control system information in the mapping table by using key information.

In the event of a Y in S7 of FIG. 6 or after S32 of FIG. 7, the first storage control system 600 (first CHF 21B, for example) transfers acquired data (that is, all the information items that have passed through the key information) to the storage management terminal 6 (or SVP 23) (S50).

The storage management terminal 6 (or SVP 23) displays the received data (that is, all the information items that have passed through the key information) and receives notice from the client regarding whether the VDEV# desired by the client and the received data are to be associated (S51).

When the storage management terminal 6 (or SVP 23) receives an association request from the client (S52), the first storage control system 600 executes the processing of S11 in FIG. 6 or S33 in FIG. 7.

According to the first modified example, information items associated with the VDEV 101 are reported to the client and it is possible to associate VDEV 101 and control system information in accordance with the client's intentions.

(2) SECOND MODIFIED EXAMPLE

Figure 12:
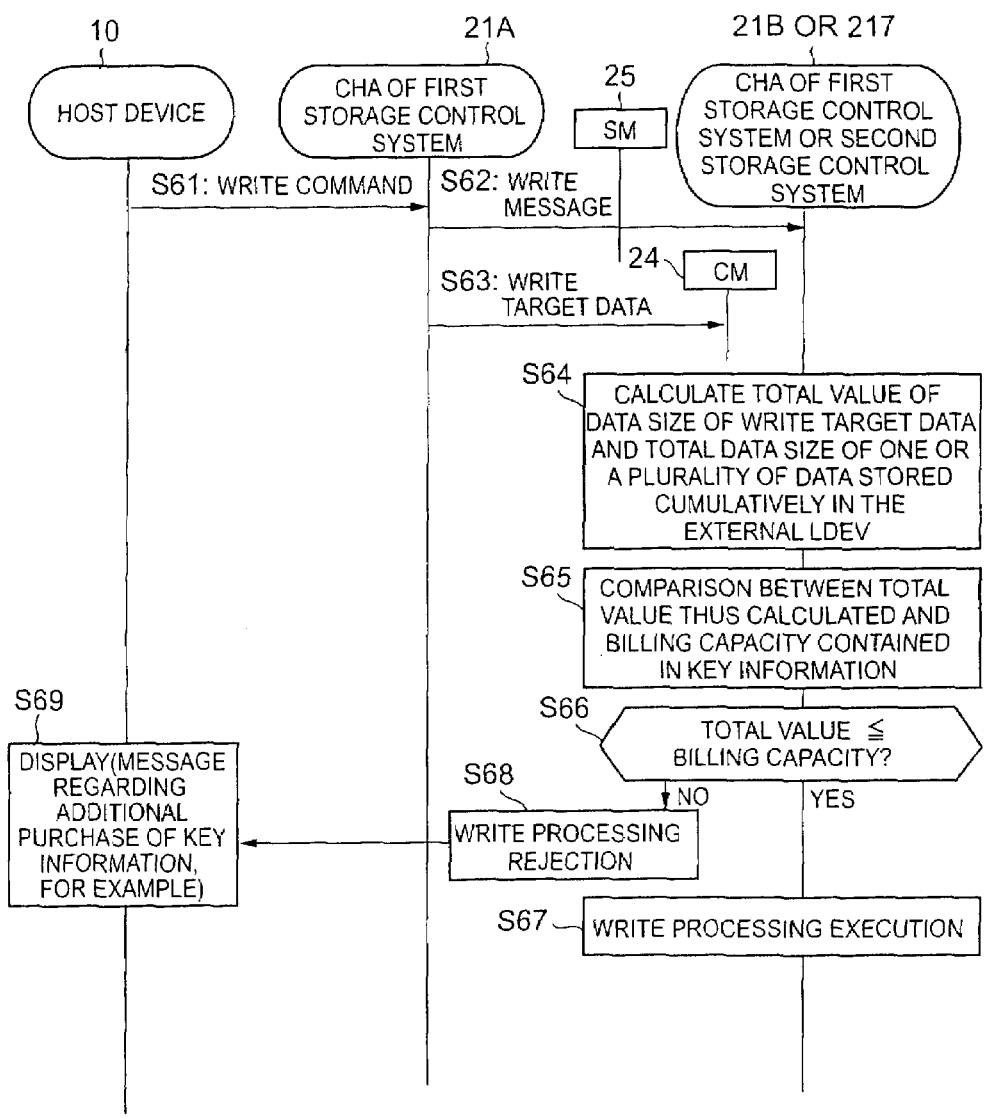
FIG. 12 shows an example of the flow of processing according to a second modified example of this embodiment.

FIG. 12 shows an example of the flow of processing according to the second modified example of this embodiment.

According to the second modified example, the storage capacity of the second storage control system 40 that can be used by the host device 10 is restricted in accordance with the billing capacity contained in the key information. The details are provided below.

When the host device 10 transmits a write command for the external LDEV 42 to the CHA 21A of the first storage control system 600 (S61), the CHA 21A transmits (S62) a write message to the first CHF 21B (or second CHF 217) via the SM 25, secures a buffer area in the CM 24, and stores (S63) write target data contained in the received write command in the secured buffer area.

The first CHF 21B (or second CHF 217) calculates (S64) the total value of the data size of the write-target data and the total data size of one or a plurality of data items accumulated in the external LDEV 42. Further, the first CHF 21B (or second CHF 217) compares (S65) the total value thus calculated with the storage capacity contained in the key information corresponding with the second storage control system 40 comprising the external LDEV 42.

If, as a result of the comparison of S65, the total value is equal to or less than the billing capacity (Y in S66), the first CHF 21B (or second CHF 217) executes write processing (S67). For example, the first CHF 21B transfers the write target data in the cache memory 24 to the second storage control system 40.

On the other hand, if, as a result of the comparison in S65, the total value exceeds the billing capacity (S66), the first CHF 21B (or second CHF 217) does not perform write processing (S68). In this case, for example, the first CHF 21B (or second CHF 217) displays notice to the effect that write processing is not performed and a message regarding the additional purchase of key information to the host device 10 (S69).

Further, when key information is additionally purchased as per the message regarding the additional purchase of key information, the following processing is executed.

Figure 13:
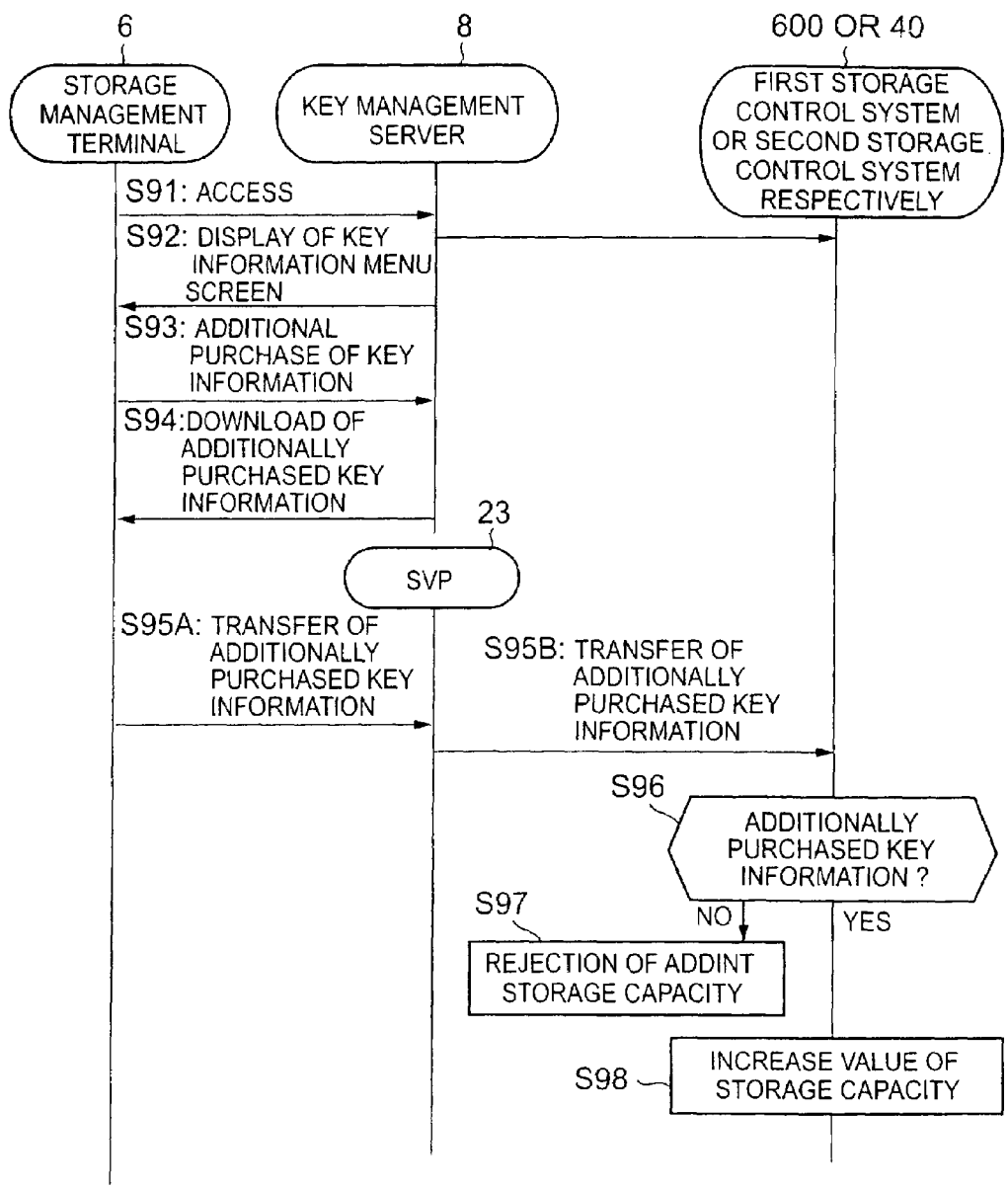
FIG. 13 shows an example of the flow of processing executed when key information is additionally purchased in the second modified example of this embodiment.

FIG. 13 shows an example of the flow of processing performed when key information is additionally purchased.

The storage management terminal 6 accesses the key management server 8 (S91) and a key information menu screen is received from the key management server 8 and displayed (S92). Further, the storage management terminal 6 instructs the key management server 8 (S93) regarding the additional purchase of key information selected from the key information menu screen and captures additionally purchased key information by way of response (S94).

Next, the storage management terminal 6 transfers the additionally purchased key information to the SVP 23 (S95A). The SVP 23 stores the received key information in the SVP storage unit 207 and transfers the key information to the first or second storage control system 600 or 40 (CHF, for example) (S95B).

If the received key information has already been stored in the SM 25 or the like or this key information is not the additionally purchased key information (for example, if a code to the effect that the key information has been additionally purchased has not been appended to the received key information) (N in S96), the first or second storage control system 600 or 40 (CHF, for example) does not add storage capacity in the key information registered in the SM 25 or the like (S97). On the other hand, if the first or second storage control system 600 or 40 (CHF, for example) has already stored the received key information in the SM 25 or the like and the key information is the additionally purchased key information (for example, if a code to the effect that key information has been additionally purchased has been appended to the key information) (Y in S96), the storage capacity in the key information registered in the SM 25 or the like is added (S98).

According to the second modified example above, the usable storage capacity in the storage capacity of the second storage control system 40 can be restricted to the storage capacity in the key information corresponding to the type of the second storage control system 40.

In addition, according to the second modified example above, the usable storage capacity can be increased by the additional purchase of key information.

An increase in the usable storage capacity may be performed by means of a method other than additionally purchasing the same key information. Further, in the key information, the billing capacity can also be finely set in the units of the second storage control system, in WWN units, or in LUN units. In addition, processing for the additional purchase of key information may be performed by the host device 10, for example.

(3) THIRD MODIFIED EXAMPLE

As for the type of information items contained in the key information, another type of information item can be adopted instead of or in addition to at least one of the vendor ID and device name.

FIG. 14 shows a constitutional example of key information relating to the third modified example of this embodiment.

According to the third modified example, the product number of the second storage control system 40, the WWN, and the LUN belonging to the WWN is adopted in addition to the vendor ID and device name as information items in the key information. Further, for each of the product number, WWN and LUN, which are added information items, the entry name (content of the information items), and the byte position and number of bytes of the control system information, and so forth, are recorded.

According to the third modified example, the type of information items contained in the key information increases, and therefore a higher level of security can be implemented.

(4) FOURTH MODIFIED EXAMPLE

Figure 15:
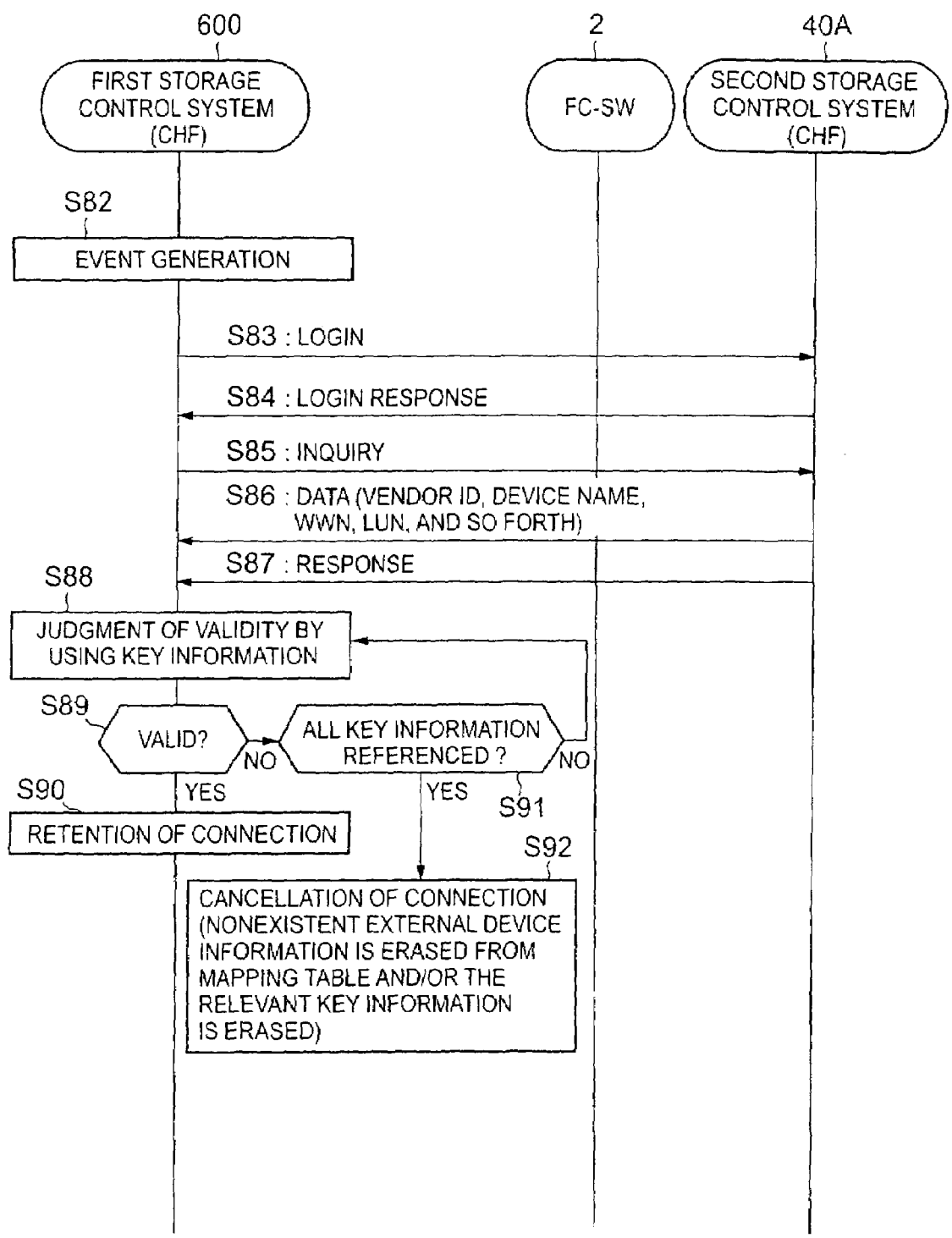
FIG. 15 shows the flow of processing relating to a fourth modified example of this embodiment.

FIG. 15 shows the flow of processing relating to a fourth modified example of this embodiment.

According to the fourth modified example, after the VDEV 101 and external device information have been associated, the validity of the association is judged.

For example, when a predetermined event has occurred (at fixed intervals or in response to a request from a client, for example) (S81), S1 to S5 in FIG. 6 are performed (S83 to S87).

Thereafter, the first storage control system 600 (first CHF 21B, for example) uses the control system information received from the second storage control system 40 and key information corresponding with the type of second storage control system 40 to judge the validity of the connection of the second storage control system 40 to the first storage control system 600 (S88). More specifically, for example, the first storage control system 600 checks whether all the information items of the received control system information are able to pass through key information constituting an information filter.

When, as a result of S88, the first storage control system 600 judges that the connection is valid (Y in S89) when all the information items in the received control system information are able to pass through the key information, the first storage control system 600 infers (S91) that the connection to the second storage control system 40 (strictly speaking, the external LDEV 42, for example).

On the other hand, when, as a result of S88, some of the information items (the vendor ID and device name, for example) in the received control system information do not pass through the key information, the first storage control system 600 judges that the above connection is invalid (N in S89). The first storage control system 600 executes the processing in S88 (N in S90) for the one or more other key information items stored in the SM 25 or the like. If the result is N in S89 (Y in S90) for the one or more other key information items, the first storage control system 600 judges that the connection to the second storage control system 40 (strictly speaking, the external LDEV 42, for example) is invalid and cancels the connection (S92). More specifically, for example, the first storage control system 600 erases external device information relating to the second storage control system 40 from the mapping table Tm.

According to the fourth modified example above, after the association between the VDEV 101 and external device information has been made, the validity of the association is judged. When the association is judged as invalid, the association can be cancelled.

(5) FIFTH MODIFIED EXAMPLE

Figure 16:
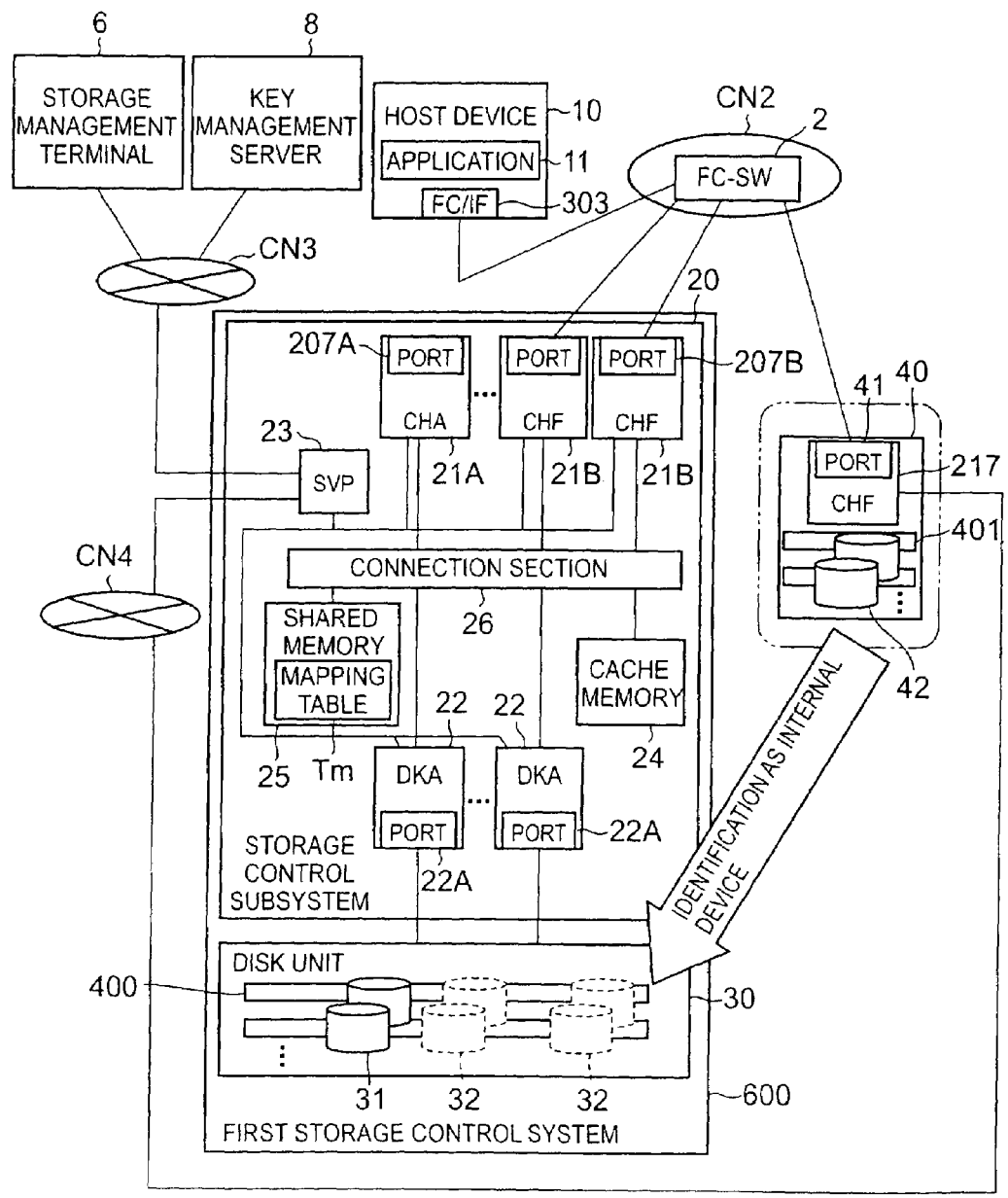
FIG. 16 shows a constitutional example of a storage system relating to a fifth modified example of this embodiment.

FIG. 16 shows a constitutional example of a storage system relating to the fifth modified example of this embodiment.

According to the fifth modified example, the host device 10 is connected to the FC-SW 2. Access to the first storage control system 600 is performed via the FC-SW 2 and access to the second storage control system 40 is made via the first storage control system 600. Further, in this case, the host device 10 is provided with a Fibre Channel Interface (FC/IF) 303 for communicating with the FC-SW 2.

According to the fifth modified example, the number of communication ports used by the first storage control system 600 can be reduced.

(6) SIXTH MODIFIED EXAMPLE

Figure 17:
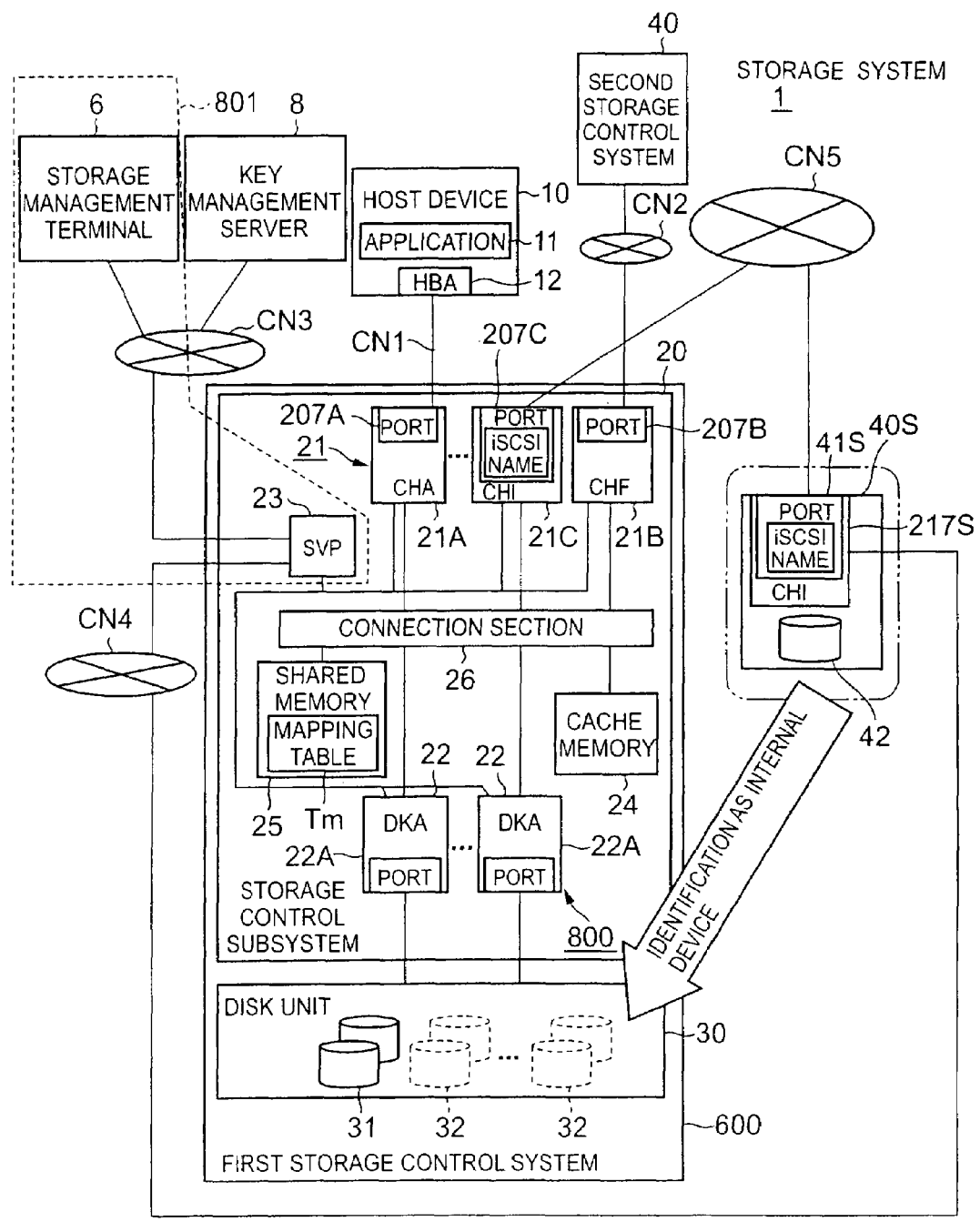
FIG. 17 shows a constitutional example of a storage system relating to a sixth modified example of this embodiment.

FIG. 17 shows a constitutional example of a storage system relating to a sixth modified example of this embodiment.

According to the sixth modified example, the channel control unit 21 comprises one or more channel adapters iSCSI (hereinafter 'CHI') 21C. The CHN 21C are able to communicate with external devices that are connected to a communication network (gateway, firewall or the Internet, for example) CN 5 in accordance with the iSCSI protocol and SCSI protocol. The CHN 21C are provided with a communication port 207C to which an iSCSI name (unique ID for the iSCSI protocol) is allocated. The communication port 207C is connected to the communication network CN5.

Further, according to the sixth modified example, a second storage control system 40S comprising a CHI 217S is provided. The CHI 217S is provided with a communication port 41S to which an iSCSI name is allocated. The communication port 41S is connected to the communication network CN 5.

According to the above constitution, the CHI 21C of the first storage control system 600 and the CHI 217S of the second storage control system 40S are able to communicate with each other via the communication network CN 5.

According to the sixth modified example, the same processing as the embodiment above can be executed. Here, the WWN is switched for the iSCSI name.

Figure 18:
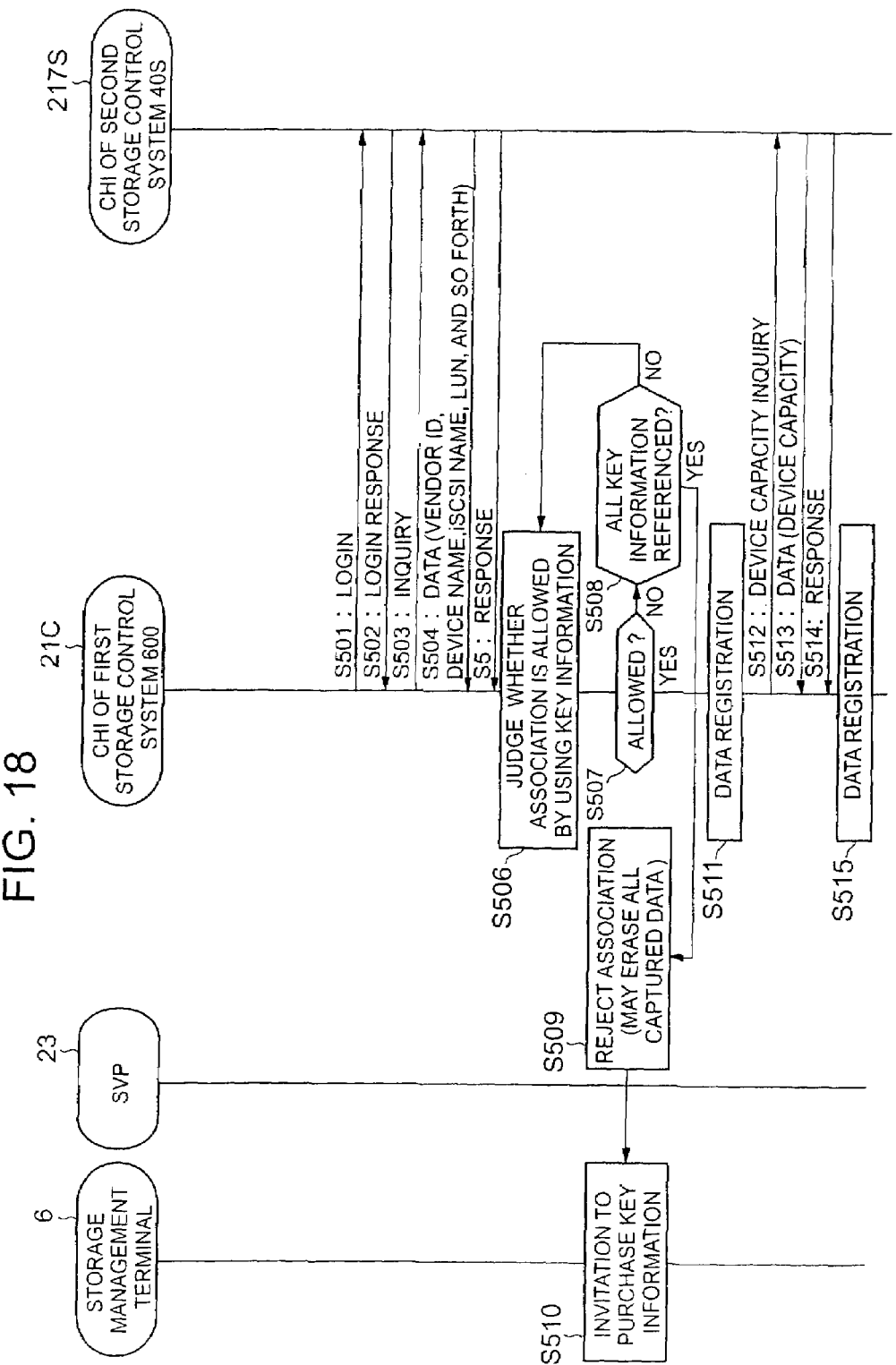
FIG. 18 shows the flow of processing in which the first storage control system 600 registers control system information in the mapping table by using key information, in the sixth modified example.

FIG. 18 shows the flow of processing in which the first storage control system 600 registers the control system information in a mapping table by using key information, according to the sixth modified example.

As can be seen by a comparison between FIG. 18 and FIG. 6 described above, the WWN is switched for the iSCSI name. However, the processing flow S501 to S514 is the same as the processing flow S1 to S14 described with reference to FIG. 6. As a result, the mapping table Tmm illustrated in FIG. 19 is built.

As can be seen from the above example, the above embodiment can also be applied to a case where the first storage control system 600 and second storage control system 40S communicate with each other on the basis of the iSCSI protocol.

(7) SEVENTH MODIFIED EXAMPLE

Figure 20:
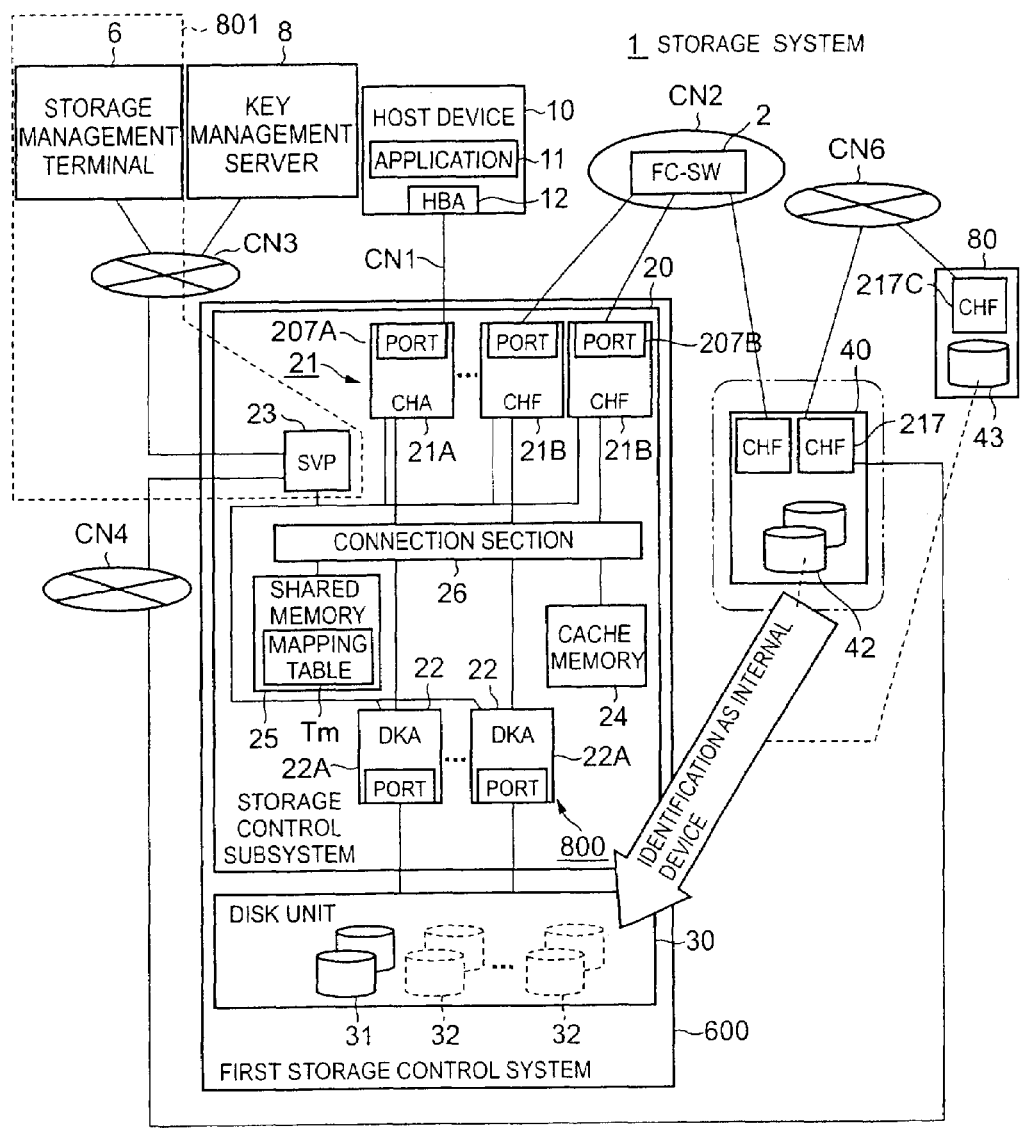
FIG. 20 shows a constitutional example of the storage system relating to a seventh modified example of this embodiment.

FIG. 20 shows a constitutional example of the storage system relating to the seventh modified example of this embodiment.

According to the seventh modified example, the first storage control system 600 is not connected to the second storage control system 40, a connection instead being made to a third storage control system 80 via a communication network (the first storage control system 600 may also be connected) CN6. In this case, by applying the embodiment above, the host device 10 is able to identify an external LDEV 43 in the third storage control system as an internal LDEV 32 in the first storage control system 600.

Further, according to the seventh modified example, for example, the CHF 217 of the second storage control system 40A is able to exercise control over whether the external LDEV 43 in the third storage control system 80 is associated with the internal LDEV 32 in the first storage control system 600. More specifically, for example, in FIG. 6, if the CHF 21B of the first storage control system 600 is switched for the CHF 217 of the second storage control system 40 that has key information and the CHF 217 of the second storage control system 40A is switched for the CH217C of the third storage control system 80, the above control relating to the association of the external LDEV 43 can be performed.

Further, the sixth modified example can also be applied in the seventh modified example.

Embodiments and modified examples of the present invention were described above but only serve to illustrate the present invention, there being no intention to limit the scope of the present invention to these embodiments and modified examples alone. The present invention can also be implemented by a variety of other embodiments. For example, although a disk array device is the focus of the embodiment above, the present invention is not limited to a disk array device, being equally applicable to an intelligent Fibre Channel Switch. Further, the processing of the first CHF 21B described in FIGS. 6 and 7, for example, may be performed by other constituent elements (CHA 21A or DKA 22, for example) of the first storage control system 600 instead of the first CHF 21B. Similarly, for example, the processing of the second CHF 217 described in FIGS. 6 and 7 may be executed by other constituent elements (CHA or DKA, for example) of the second storage control system 40 instead of the second CHF 217. Further, the shared memory 25 and cache memory 24 may be integrated rather than being physically separate, for example. Moreover, the first CHF 21B may be connected to the host device 10 in addition to the FC-SW 2, for example.

The channel control unit 21 and disk control unit 800 may also be integrated, for example.

What is claimed is:

1. A storage control system, connected to an external storage control system and a host device, for controlling access by the host device to the storage resources in the external storage control system, comprising:
   a plurality of logical storage devices that store data exchanged with the host device;
   one or a plurality of physical storage devices comprising the plurality of logical storage devices;
   a cache memory that stores data exchanged between the host device and the physical storage devices;
   a channel control unit, having a control processor, that receives control system information from the external storage control system and controls data communications between the cache memory and at least one of the host device and the external storage control system;
   a disk control unit that controls data communications between the cache memory and the physical storage devices; and
   a key information item storage area that stores one or a plurality of key information items with a fixed constitution,
   wherein each of the one or the plurality of key information items corresponds with each of the type or types of the external storage control system, and
   wherein the control processor of the channel control unit selects a key information item from among the one or the plurality of key information items, judges whether, in the control system information received from the external storage control system and indicated by the information element in the selected key information item, there exists the information element in the selected key information item, and forms a logical path between the host device and the storage resources in the external storage control system when an affirmative judgment result is obtained but does not form the logical path when a negative judgment result is obtained.

2. The storage control system according to claim 1, wherein the key information item includes:
   an information element that indicates at least one of the vendor ID and device name of the external storage control system corresponding with this key information item;
   an information element that indicates the location in the control system information of at least one of the vendor ID and the device name; and
   an information element that indicates at least one of the data size of the vendor ID and the device name.

3. The storage control system according to claim 1, wherein a maintenance/management system for maintaining or managing the storage control system is connected to the channel control unit, and
   wherein when the affirmative judgment result is obtained, the control processor of the channel control unit transmits all the information items included in the received control system information to the maintenance/management system such that all the information items are displayed, and forms the logical path upon receiving a logical path formation request from the maintenance/management system.

4. The storage control system according to claim 1, wherein another information element indicating the usable storage capacity in the storage resources in the external storage control system corresponding with the key information item is included in another predetermined location of the key information item, and
   wherein when write target data is received from the host device, the control processor of the channel control unit judges whether the storage capacity indicated by the another information element in the key information item corresponding with the type of the external storage control system is exceeded by the total value of the data size of the write target data and the total data size of one or a plurality of data stored cumulatively in the external storage control system, and stores the write target data in the storage resources in the external storage control system when the indicated storage capacity is not exceeded.

5. The storage control system according to claim 4, wherein, when the total value exceeds the indicated storage capacity, the control processor of the channel control unit communicates the fact that it is necessary to increase the storage capacity indicated by the another information element in the key information item to the host device, receives data for increasing the indicated storage capacity and then increases the value of the indicated storage capacity.

6. The storage control system according to claim 1, wherein the control processor of the channel control unit forms the logical path and then, when a predetermined event has occurred, receives the control system information from the external storage control system and performs the judgment, erasing the logical path if a negative judgment result is obtained.

7. The storage control system according to claim 1, wherein a maintenance/management system for maintaining or managing the storage control system is connected to the channel control unit,
   wherein the maintenance/management system comprises:
   a maintenance/management storage unit for storing data;
   the key information item is downloaded to the maintenance/management system from a key management database that stores cumulatively a plurality of key information items corresponding with a plurality of types of the external storage control system and is then stored in the key information item storage area; and
   the key information item storage area is provided in local memory that is used by the control processor of the channel control unit, and the maintenance/management storage unit.

8. The storage control system according to claim 1, wherein a Fibre Channel Adapter or iSCSI adapter connected to the external storage control system is included in the channel control unit, and
   wherein the control processor is mounted in the Fibre Channel Adapter or the iSCSI adapter.

9. The storage control system according to claim 8, wherein the Fibre Channel Adapter or the iSCSI adapter transmits an inquiry command according to the SCSI protocol to the external storage control system and receives the control system information from the external storage control system in response to the inquiry command.

10. The storage control system according to claim 1, comprising:
    a virtual intermediate storage device between the logical storage device and the physical storage device,
    wherein the control processor of the channel control unit forms the logical path by associating the logical storage device and the external logical storage device, which is a storage resource in the external storage control system, with a logical location in the virtual intermediate storage device.

* * * * *